(12) United States Patent
Spungin

(10) Patent No.: US 12,282,495 B2
(45) Date of Patent: Apr. 22, 2025

(54) COMPUTER SYSTEMS AND METHODS FOR SELECTIVE SYNCHRONIZATION

(71) Applicant: TwelveTone LLC, Marblehead, MA (US)

(72) Inventor: Steven Spungin, Marblehead, MA (US)

(73) Assignee: TwelveTone LLC, Marblehead, MA (US)

( * ) Notice: Subject to any disclaimer, the term of this patent is extended or adjusted under 35 U.S.C. 154(b) by 0 days.

(21) Appl. No.: 18/595,612

(22) Filed: Mar. 5, 2024

(65) Prior Publication Data

US 2024/0303251 A1    Sep. 12, 2024

Related U.S. Application Data

(60) Provisional application No. 63/450,144, filed on Mar. 6, 2023.

(51) Int. Cl.
G06F 16/27 (2019.01)

(52) U.S. Cl.
CPC .................................. G06F 16/27 (2019.01)

(58) Field of Classification Search
CPC ....................................................... G06F 16/27
USPC ......................................................... 707/638
See application file for complete search history.

(56) References Cited

U.S. PATENT DOCUMENTS

| | | | |
|---|---|---|---|
| 6,115,027 A | 9/2000 | Hao | |
| 9,792,266 B1 | 10/2017 | Armstrong | |
| 10,956,446 B1 | 3/2021 | Hurst | |
| 11,157,292 B2 * | 10/2021 | Goudarzi | G06F 9/44505 |
| 2006/0101064 A1 | 5/2006 | Strong | |
| 2009/0265487 A1 | 10/2009 | Zhang | |
| 2013/0110941 A1 | 5/2013 | Lewis | |
| 2014/0019858 A1 | 1/2014 | Mcallister | |
| 2016/0085381 A1 | 3/2016 | Parker | |
| 2023/0262507 A1 * | 8/2023 | Marquezan | G06F 16/211 709/224 |
| 2023/0289365 A1 | 9/2023 | Towles | |
| 2024/0303251 A1 * | 9/2024 | Spungin | G06F 16/27 |
| 2024/0378062 A1 * | 11/2024 | Mysore | G06F 11/3471 |

FOREIGN PATENT DOCUMENTS

WO    2005116892 A    12/2005

* cited by examiner

*Primary Examiner* — Joshua Bullock
(74) *Attorney, Agent, or Firm* — Blueshift IP; Robert Plotkin

(57) ABSTRACT

A computer system enables instances of properties (e.g., of resources such as files in a file system) to be selectively synchronized with each other. Each instance of a property may have a plurality of versions. A primary version of the property is shared (and synchronized) among all property instances. Each property instance may also have its own secondary version of the property. Each property instance has its own effective version handle, which points to either the property's primary version or the property instance's secondary version of the property. A comparison is performed between a version state of the property's primary version and a version state of the secondary version of a first instance of the property to produce comparison result output. An instance state is exposed to indicate: (1) the version pointed to by the first instance's effective version handle; and (2) the comparison result output.

33 Claims, 19 Drawing Sheets

COMPUTER SYSTEMS AND METHODS FOR SELECTIVE SYNCHRONIZATION

CROSS-REFERENCE TO RELATED APPLICATIONS

This application claims priority from U.S. Prov. Pat. App. No. 63/450,144, filed on Mar. 6, 2023, entitled, "Selective Aspect Synchronization," which is incorporated by reference herein.

BACKGROUND

Various technologies exist for storing, transmitting, and synchronizing data across a plurality of computing devices over a network. For example, users often save files in local or network-accessible (e.g., cloud-based) file systems. A user may make such a file accessible to other users in a variety of ways, such as by transmitting that file via email, by providing a link to that file to another user (who may then access the file via the link and view and/or download the file), or by using a secure file transfer mechanism. A variety of systems for synchronizing files across devices exist, such as those made available by Dropbox, Box, Google (e.g., Google Drive), Microsoft (e.g., Microsoft OneDrive), and Citrix (e.g., Citrix ShareFile).

Such systems have a variety of drawbacks, including, but not limited to, the following. Such systems typically embody a variety of design choices relating to synchronization, without making those choices transparent to the user or enabling the user to override those choices. For example, in many systems, when a user saves a new file locally into a synchronized folder on one device, the system automatically and immediately saves copies of that file into all other instances of that synchronized folder on other devices. This may or may not reflect the user's intention or desire. The user may, for example, wish for the new file to remain only in the local synchronized folder, either permanently, or until a subsequent time of the user's choice. Yet the user may not be granted the ability to implement this preference, due to the system's default (and non-overridable) behavior. This is merely one example of many possible ways to implement synchronization, yet existing systems typically grant the user little or no control over such options.

Another drawback of existing synchronization systems is that they provide limited information to users about the synchronization status of files and other resources. Some systems provide an icon (such as a checkmark) to indicate whether a particular local file is synchronized with other instances of that file. However, such a mere binary indication on a file-by-file basis provides very little information to the user about the synchronization status of individual resources (e.g., files) and of collections of resources (e.g., folders), and does not provide any indication of how future actions (e.g., adding a file or modifying an existing file) will impact synchronization.

Yet another drawback of existing synchronization systems is that they tend to apply to static resources, such as files, rather than to dynamic resources, such as audio or video streams. Although some systems exist for synchronizing video streams (e.g., Amazon Prime Video Watch Party and Apple SharePlay), such systems have the drawback described above of imposing design choices on users.

Furthermore, existing synchronization systems tend to enable only a single type of resource (e.g., files or video streams) to be synchronized. Users desiring to synchronize multiple types of resources must resort to using separate synchronization systems to synchronize each type of resource. Each such system has its own settings and user interface. This compounds the problems above and fails to provide the user with any unified control over, or visibility into, the synchronization state of resources, whether individually or in combination.

Additionally, existing synchronization systems focus on synchronizing a single aspect of a resource, such as its content, versus other aspects of the resource, such as how it is presented and styled.

Furthermore, existing synchronization systems tend to center around a single shared version of a resource instead of integrating alternate versions.

SUMMARY

A computer system enables instances of properties (e.g., of resources such as files in a file system) to be selectively synchronized with each other. Each instance of a property may have a plurality of versions. A primary version of the property is shared (and synchronized) among all property instances. Each property instance may also have its own secondary version of the property. Each property instance has its own effective version handle, which points to either the property's primary version or the property instance's secondary version of the property. A comparison is performed between a version state of the property's primary version and a version state of the secondary version of a first instance of the property to produce comparison result output. An instance state is exposed to indicate: (1) the version pointed to by the first instance's effective version handle; and (2) the comparison result output.

DETAILED DESCRIPTION

Figure 1A:
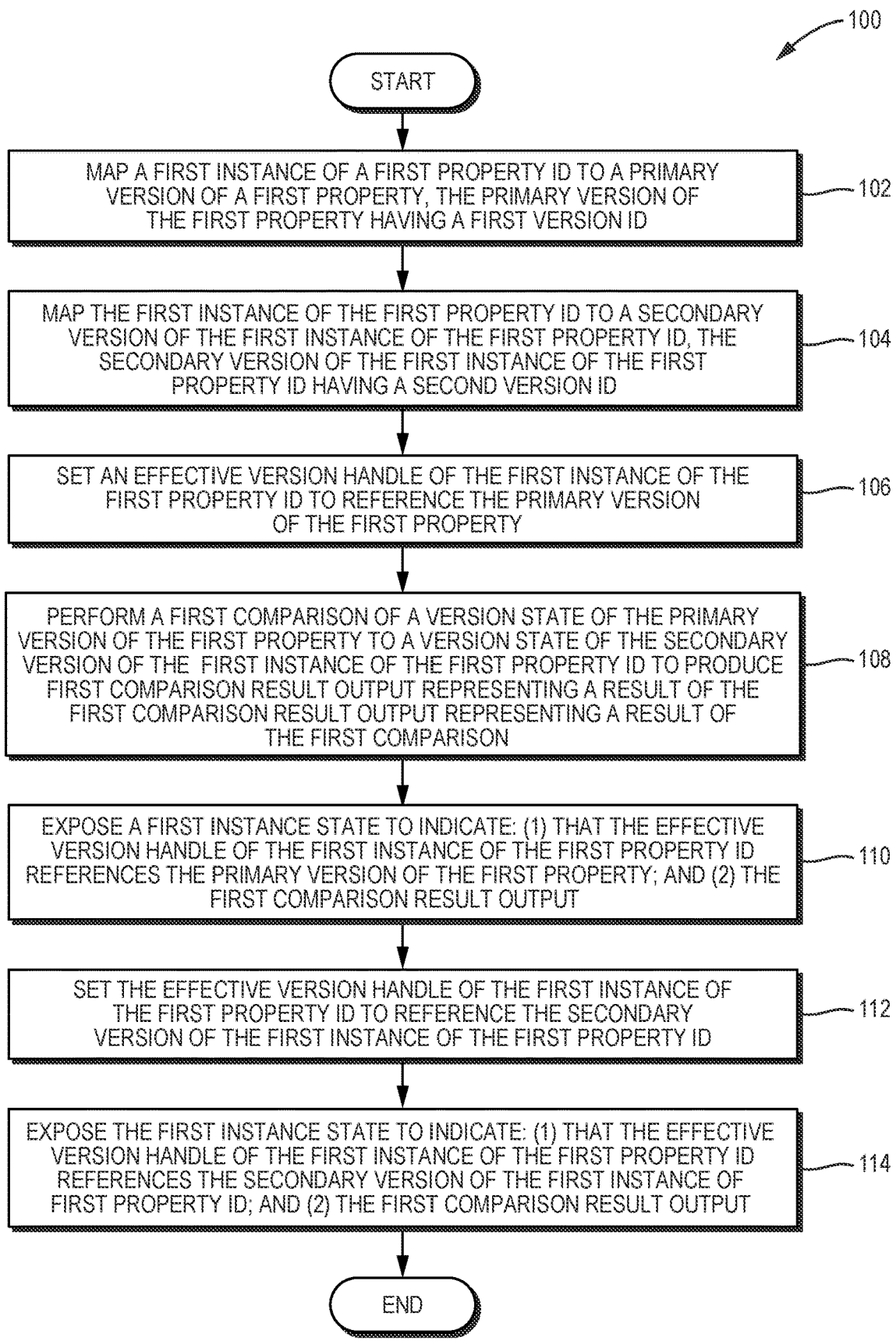
FIGS. 1A-1C illustrate methods performed by various embodiments of the present invention.

A computer system enables instances of properties (e.g., of resources such as files in a file system) to be selectively synchronized with each other. Each instance of a property may have a plurality of versions. A primary version of the property is shared (and synchronized) among all property instances. Each property instance may also have its own secondary version of the property. Each property instance has its own effective version handle, which points to either the property's primary version or the property instance's secondary version of the property. A comparison is performed between a version state of the property's primary version and a version state of the secondary version of a first instance of the property to produce comparison result output. An instance state is exposed to indicate: (1) the version pointed to by the first instance's effective version handle; and (2) the comparison result output.

Consider an example in which two instances of a property are mapped to a common version of that property, and in which the effective version handles of the two instances of a property are pointing to two different versions of that property. The two instances perform comparisons of their effective versions to the common version, and share the results of those comparisons with each other, without exposing the version states of their effective versions with each other.

If the state of one of those versions changes, the following will happen:

No automatic synchronization: Since the instances are pointing to different versions (e.g., one to the primary version and the other to a non-primary (e.g., secondary) version), the change in the state of one version will not necessarily automatically update or change the state of the other version.

Comparison and indicators update: The system may perform a comparison between the updated version state and the state of the common mapped version. If the system is configured to do so, it will produce a new comparison result output indicating whether the compared version states are now different ("not in sync").

Instance State Exposure: The instance state that is exposed (made visible) to the user will be updated to reflect the new comparison result. This means that the system will indicate to the user that the version states are no longer the same, assuming they were in sync before the change.

Notify-on-change feature: If the system has a notify-on-change feature enabled and the instance with the unchanged version state is set to notify on change, the host associated with that instance may receive an alert or notification indicating that the other version has changed. This allows the user to review the changes and decide whether to update their version to match, or to revert the changes.

In summary, when one version changes and the effective version handles of two instances are pointing to different versions, the system may provide updated information about the synchronization status, but it need not automatically synchronize the versions. Instead, the system performs an updated comparison of the versions and reflects the result in one or more instance states.

The above is merely one example of indicators that embodiments of the invention may generate and manifest. As another example, if two instances are in sync and have different effective versions, the system may generate and manifest, for each such instance, an indicator which indicates that the instance is in-sync and uses a different effective version than the other instance. As another example, if two instances are in sync and have the same effective version, the system may generate and manifest, for each such instance, an indicator which indicates that the instance is in-sync and uses the same effective version as the other instance. As another example, if two instances' private versions are not-in-sync with the common version and have the same effective version (the common version), the system may generate and manifest, for each such instance, an indicator which indicates that the instance is not-in-sync with the common version and uses the same effective version as the other instance.

A computer system, referred to herein as a "selective synchronization system," synchronizes properties, the version state of a plurality of versions, and the versions to which a plurality of property instances are mapped. The selective synchronization system may includes a plurality of properties. The term "property" may be or include any kind of data stored on one or more computer-readable media. A property may, for example, be or include a data structure, a file, an audio/video stream (such as an audio/video call), a presentation of information, or any resource accessible via a Uniform Resource Identifier (URI) (e.g., a Uniform Resource Locator (URL)). As this implies, a property may be static or dynamic (e.g., in the case of an audio/video stream).

A "property" specifies a specific entity that is managed by an embodiment of the selective synchronization system. Examples of a property include whether a user interface element (also referred to herein as an "outlet," such as a window, pane, tab, dialog box, or any subset thereof) is visible; size, position, format, and/or shape of an outlet; the subject displayed within an outlet (e.g., the URL of a document displayed within an outlet); the portion of a resource being displayed (e.g., boundaries of an image, first and/or last visible line of text, scale factor); the content of a resource (e.g., text content of a document, audio content of an audio file, video content of a video file); the state of a resource (e.g., isPlaying or isPaused); the focus of an outlet; style (e.g., font, font size, font color); an overlay (e.g., a pointer, click, annotation, highlight, pin, or marker); an accessory (e.g., bookmark, chat, review, or comment); the order of elements within a resource or the order in which elements within a resource are displayed. A property is identified by a corresponding property identifier (property ID).

Each property has multiple versions that represent alternative states of the property. Each such state of a version is referred to herein as a "version state." Each version is identified by a corresponding version identifier (version ID).

Multiple instances of any property may exist within an embodiment of the selective synchronization system. Terms such as "instance," "property instance," and "instance of a property" are used interchangeably herein. Multiple instances of a property that are mapped to one or more versions having the same version ID will share the same version state with other instances of that property. The version state of a common version ID is assumed to be synchronized, using any suitable synchronization mechanisms, between instances.

Each instance of a property has an effective version handle. The instance is mapped to a primary version of the property (a common version shared between other instances of the property) and a secondary (or other non-primary) version of the property (an alternative version of the property that may be distinct to each instance of the property). At any point in time, the effective version handle of an instance of a property references either that property instance's primary version or secondary (or other non-primary) version. The version that a property instance's effective version handle references may change over time. For example, a property instance may, at one time, reference the property instance's primary version and then change to reference the property instance's secondary version, and vice versa. The state of any version (e.g., a primary version, a secondary version, or any non-primary version) of an instance may also change over time, even if the effective version handle of the instance does not change.

A "host" may utilize one or more instances of one or more properties. Different hosts may utilize different instances of the same property. For example, a first host may utilize a first instance of a first property, while a second host may utilize a second instance of the first property. Any reference herein to "an instance's host," "the host of an instance," and similar phrases should be understood to refer to the host that utilizes that instance. "Utilizing" an instance refers to the following: (1) reading, writing, and observing version state; (2) reading, writing, and observing exposed instance states; (3)

configuring mapped versions; (4) representing indicator state via a user interface; (5) enumerating and invoking available actions.

As an example, a first host that manages a first instance of a first property may execute on a first computer, and a second host that manages a second instance of the first property may execute on the first computer or a second computer. As another example, a first host that manages a first instance of a first property may be or execute within a first software application on a first computer, and a second host that manages a second instance of the first property may be or execute within a second software application on the first computer.

The "effective version" of a property instance is the dereferenced version that is resolved via the property instance's effective version handle. The effective version of a property instance is utilized by the host of the property instance when accessing the version state of that property instance.

For each instance, embodiments of the selective synchronization system may perform a comparison between the version state of the instance's dereferenced primary version and non-primary (e.g., secondary or transient) version to produce a comparison result. The comparison result may, for example, indicate whether the compared versions are equal to each other, according to some measure of equality. Embodiments of the selective synchronization system may perform such a comparison repeatedly (e.g., periodically) to generate updated comparison results.

Each instance exposes one or more of the following: (1) its effective version handle, (2) its mapped versions (e.g., the IDs of the primary and non-primary), (3) its comparison result, (4) feature states such as Notify-On-Change Enabled, and (5) error states. Embodiments of the selective synchronization system may use such exposed information from each instance to generate an indicator state for that instance. An instance's indicator state may incorporate or otherwise be generated based on the exposed instance states of one or more instances of one or more property IDs. Embodiments of the selective synchronization system may use such exposed information from one or more instances to generate available actions for each host.

As is well-known, "exposing" a value of a variable or other data structure refers to making that value accessible or available to other parts of a program, to other programs, and/or or to the end user. Such exposure may be implemented in any of a variety of ways, such as by making the value accessible through the data structure's public interface, by using an API, or by using global variables or public fields. Embodiments of the present invention may expose any of the data disclosed herein using any method for performing such exposing.

U.S. Prov. Pat. App. No. 63/450,144, referenced above (referred to hereinafter as "the provisional patent application"), uses certain terminology which differs from some terminology used herein. To aid in understanding such differences, consider that:

The description herein refers to "instances" of a "property" to describe what is referred to in the provisional patent application as "version peers" of a sync module".

The description herein refers to "the primary version" to describe what is referred to as the "joined version register" in the provisional patent application.

The description herein refers to "the secondary version" to describe what is referred to as the "detached version register" in the provisional patent application.

The description herein refers to "the transient version" to describe what is referred to as the "transient version register" in the provisional patent application.

The description herein refers to "the effective version handle" to describe what is referred to as the "effective version handle" and "peer mode" in the provisional patent application.

The description herein refers to "the comparison," "the comparison result," or "the comparison output result" to describe what is referred to as the "sync state" in the provisional patent application. Furthermore, in the description herein, the comparison may or may not be factored into the indicator state.

The description herein refers to "the exposed instance state" to describe what is referred to as the "module state" and "module settings" in the provisional patent application. The description herein uses "the exposed instance state" to encompass some or all of the following, in any combination: the comparison, the effective version handle, the mapped version IDs (e.g., the primary version ID, the secondary version ID, and/or the transient version ID), whether notify-on-change is enabled, and error state.

Any use of terms from the provisional patent application in the description herein may be understood by reference to the explanation above.

Embodiments of the selective synchronization system may use one or more "sync modules" to manage synchronization of resources. As will be made clear from the description below, the term "synchronization" may refer both to synchronizing versions between peers and to demultiplexing between a host proxy and a version. Whenever a property of a sync module is referred to herein in isolation (e.g., "the module ID" or "the module mode"), it should be understood that this refers to the stated property of the sync module instance that contains the property. Any reference herein to a "module" should be understood to refer to a sync module.

Consider a system which includes a plurality of "hosts." A host may, for example, be a computer of any kind (whether physical or virtual).

In general, and as will be described in more detail below, embodiments of the selective synchronization system may synchronize one or more properties between two or more versions of a resource, or between a host proxy and a version. Such versions may, for example, be shared by two or more hosts, in which case the synchronization may be performed across the two or more hosts. Embodiments of the selective synchronization system provide its users with a high degree of control over which properties are synchronized, which versions of those properties are synchronized, and how changes made by one user to a property affect other versions of that property, such as other versions of that property that are accessible to other users, e.g., on other hosts. Furthermore, embodiments of the selective synchronization system provide output to users to provide them with information about the comparison of one or more versions (including versions accessible to the user and versions accessible to other users) at any particular time.

Each of the hosts may include zero or more sync modules executing on the hosts. Each of the hosts may include zero or more resources. Each of the sync modules may manage a corresponding one of the resources. One or more of the sync modules may manage different versions of the same resource. For example, multiple versions of the same resource may exist on the same or multiple hosts. As a particular example, a first sync module on a first host may manage a first version of a first resource, a second sync module on a second host may manage a second version of the first resource, and a third version may be managed by both the first sync module and the second sync module.

A resource may or may not be on a host in an embodiment of the selective synchronization system. For example, a resource may be stored on a computer or storage device that is not a host in the selective synchronization system. Hosts in the selective synchronization system may access resources in any of a variety of known ways, whether or not such resources are on hosts in the selective synchronization system.

A sync module is a modular component that manages module settings, peers, and versions associated with a resource that corresponds to the sync module. As mentioned above, a plurality of sync modules may manage the same resource. As will be described in more detail below, each of the plurality of sync modules that corresponds to a single resource may differ in the values of their settings, peers, and versions in any way, and such values may change over time.

A "module host" is a process that hosts one or more sync modules. The particular sync modules that a particular module host interacts with are referred to herein as "the module host's sync modules." Similarly, the particular module host that a sync module interacts with is referred to herein as "the sync module's module host." A module host may execute on a host. One or more module hosts may execute on a host. For example, a single host may have several applications/tabs open simultaneously. Each application and/or tab may be considered to be a module host. A module host has access to the available actions, indicator state, and properties made available through a host proxy.

In one embodiment, a system implements an embodiment of the selective synchronization system which includes a module host that utilizes two sync modules, namely a first sync module and a second sync module. The first sync module may include an indicator state, available actions, a host proxy, and a sync module. Similarly, the second sync module may include its own indicator state, available actions, host proxy, and sync module. More generally, each of the sync modules may include any of the components disclosed herein. The first sync module may expose its indicator state and available actions to the module host, and may expose properties defined by the first sync module's version schema to the module host via the first sync module's host proxy. Similarly, the second sync module may expose its indicator state and available actions to the module host, and may expose properties defined by the second sync module's version schema to the module host via the second sync module's host proxy.

A "module ID" is a unique identifier that is used to associate two or more sync modules between module hosts. Two or more sync modules that have the same module ID are referred to herein as "module peers." As this implies, if a first module host utilizes a first sync module having a first module ID, and a second module host utilizes a second sync module having the first module ID, then the first sync module and the second sync module are module peers. A third sync module which has a second module ID (i.e., a module ID whose value is not the same as that of the module IDs of the first and second sync modules), then the first sync module and the second sync module are not module peers with the third sync module.

Module hosts executing on different hosts may utilize module peers. For example:
    a first module host may execute on a first host;
    the first module host may utilize a first sync module on the first host;
    a second module host may execute on a second host;
    the second module host may utilize a second sync module on the second host;
    the first sync module and the second sync module may be module peers.

A "peer ID" is a unique identifier assigned to each of a plurality of module peers. For example, if a first sync module and a second sync module are module peers with each other, then the first sync module may be assigned a first peer ID and the second sync module may be assigned a second peer ID. Peer IDs need only be unique within a particular group of module peers, because the combination of a sync module ID and a module peer ID creates a unique ID.

The term "module settings" refers herein to the collective value of a sync module's configuration, modes, submodules, and version schema. The term "module settings" also implies the sync module's available actions and indicator state.

The term "indicator state" refers herein to values and computed values that are provided by a sync module to any module host that utilizes that sync module. These values are related to a sync module and its module peers.

The term "indicators" refers herein to output that is generated by a module host based on the indicator state of a sync module that is utilized by the module host. Such output may, for example, be visual output that is based on the sync module's indicator state. A module host that utilizes a plurality of sync modules may output one or more indicators for each utilized sync module. A module host may represent the indicator state of one or more sync modules that are utilized by the module host in any of a variety of ways.

The term "available actions," with respect to a particular module peer, refers to actions that are available to be performed by the particular module peer with respect to one or more module settings of that particular module peer, settings of its module peers, actions that act on other module peers of the particular module peer, and actions that act on the available versions of the particular module peer.

The term "submodules" refers herein to a plurality of sync modules that are aggregated by a common sync module, referred to herein as a "parent sync module" or "parent module." The selective synchronization system may include one or a plurality of parent sync modules, each of which may aggregate its own plurality of sync modules (referred to herein as "component" or "child" sync modules, or merely as "component modules" or "child modules"). A parent sync module combines the available actions, indicator state, and host proxy of its component (child) sync modules into a single point of control. For example, the selective synchronization system may propagate a change made to any of a parent sync module's available actions, indicator state, or host proxy to all of the parent sync module's child sync modules, thereby eliminating the need to repeat such a change manually to each of the child sync modules. Conversely, the selective synchronization system may propagate a change made to a child sync module's indicator state to that child sync module's parent sync module. A parent sync module may also filter and/or combine properties from some or all of its child sync modules to produce the properties of the parent sync module. An action performed by a parent sync module may be propagated to some or all of the parent sync module's child sync modules. Conversely, an action performed by a child sync module may be propagated to the child sync module's parent sync module.

The term "user" refers herein to a person who interacts with a sync module through the sync module's available actions, indicator state, and properties exposed by the host proxy of the sync module.

The term "sync button" refers to a user interface element (whether or not in the form of a button) that displays a representation of the indicator state of a sync module, provides a means to view and invoke the sync module's available actions, and provides details and configuration of the sync module's settings.

In the description that follows of versions, any reference to "the sync module" should be understood to refer to the sync module that is associated with the version or other data under discussion. For example, a sync module may include one or more versions. Any reference to "the sync module" in relation to any of the versions within a particular sync module should be understood to refer to that particular sync module.

The term "version schema" refers herein to a specification that defines the properties and aspects managed by a sync module. Each sync module has its own version schema. The version schemas of two sync modules may define different properties and aspects than each other. For example, a first sync module schema may define a property or aspect that is not defined by a second sync module schema.

The term "version" refers herein to an implementation and state instance of a version schema. Each version provides a version state to the sync module. Each version manages its own persistence and synchronization of version schema properties. A version is identified by a "Version ID". Versions with the same "Version ID" are considered to be shared and synchronized between all sync modules accessing the version.

The term "available versions" refers to all versions that are accessible to the sync module. For example, a sync module may include a list of pointers to its available versions; as a result, all of the available versions that are pointed to by the list of pointers are accessible to the sync module. As will be described in more detail below, each available version may, for example, be either a private version, a public version, or a transient version, and each sync module may have zero or more private available versions, zero or more public available versions, and zero or more transient available versions.

The term "version type," as used herein, indicates whether an available version is visible to the sync module and its module peer sync modules. Values of version type include "public," "private," and "transient."

The term "host proxy," as used herein, refers to a proxy provided by the sync module, to the sync module's module host, that exposes managed properties defined by the sync module's version schema. The sync module routes properties from the host proxy, using version handles and pointers, to and from available versions.

The term "property demultiplexer," as used herein, refers to a mechanism that facilitates reading, writing, and observing properties between a host proxy and one or more available versions.

The term "persistence," as used herein, in connection with a particular version, refers to the process of saving and loading version state. This includes the configuration of both the storage provider and the storage location.

The term "version register," as used herein, refers to a variable that associates a name with an available version pointer. Examples of version register names include joined, detached, disconnected, and transient.

The term "version pointer," as used herein, refers to the value of a version register that indicates an available version.

The term "version location," as used herein, refers to data that identifies an available version or host proxy of a specified module peer.

The term "joined version," as used herein, refers to the version indicated by the joined version register. The sync module routes properties that have their version handle set to "joined" to and from the joined version. (See the definition of "version handle" below.)

The term "detached version," as used herein, refers to the version indicated by the detached version register. The sync module routes properties that have their version handle set to "detached" to and from the detached version.

The term "disconnected version," as used herein, refers to the version indicated by the disconnected version register. The sync module routes properties that have their version handle set to "disconnected" to and from the disconnected version.

The term "transient version," as used herein, refers to the version indicated by the transient version register. The sync module routes properties that have their version handle set to "transient" to and from the transient version.

Two or more sync modules are referred to herein as "version peers" if those sync modules are module peers with each other and they have the same joined version (i.e., the version pointed to by the joined version register of the module peers).

The term "property," as used herein, refers to a named variable declared by a version schema. Each property is persisted and synchronized by a version implementation, and is associated with an available version via its effective version handle.

The term "aspect," as used herein, refers to a plurality of properties, which may be grouped within the aspect by functionality or other means. A first aspect of a version schema may include a first proper subset of the properties of that version schema. A second aspect of the version schema may include a second proper subset of the properties of that version schema. The first aspect may include at least one property that is not included in the second aspect.

The term "version state," as used herein, refers to the value of an available version's properties.

The term "peer mode," as used herein, refers to data that specifies the default version handle to use when routing properties between the host proxy and available versions. The peer mode, which may be set independently for each of a plurality of sync modules such that different sync modules may have different peer modes, also influences how a sync module calculates its indicator state, available actions, and sync state.

The term "module mode," as used herein, refers to configuration that specifies the available peer modes of a sync module, along with any module mode restrictions and version handle overrides. A single module mode may apply to all, or a subset, of module peers.

The term "version handle" refers to data that specifies the version register to use when routing a property between the host proxy and the available versions. Each property has an effective (i.e., explicit or implicit) version handle.

The term "default version handle," as used herein, refers to data that specifies the version handle to use for properties that do not have a version handle override set. The default version handle may be dynamically changed, such as when the peer mode changes.

The term "version handle overrides," as used herein (also referred to as "overrides"), refers to a list of properties and aspects that override the default version handle.

The term "merge into," as used herein, refers to combining two or more version states and then storing the result as a new version state.

The term "sync state," as used herein, refers to a property's joined version state compared to its detached version state. Examples of values of sync state are in-sync (e.g., when the property's joined version state satisfies an implementation-defined equality condition in relation to the property's detached version state), not-in-sync (e.g., when the property's joined version state does not satisfy the implementation-defined equality condition in relation to the property's detached version state), and non-applicable (when a managed property is disconnected or disabled).

The term "routing," as used herein, refers to the process of getting, setting, and observing version state changes of a property when connecting a host proxy to an available version.

Having introduced some terms that are relevant to the selective synchronization system, certain aspects of embodiments of that system will now be described in more detail.

As mentioned above, the sync module is an architecture that integrates module settings, peers, and versions. The sync module uses its module settings to define and selectively manage its properties. One role of the sync module is to perform demultiplexing of a plurality of available properties, aspects, and versions contemporaneously, in order to enable flexible synchronization of those versions across a plurality of hosts in ways that are not possible using existing synchronization systems. For example, a single module host may utilize two sync modules, and thereby enable communication between those sync modules and a common module host.

Responsibilities of the sync module include, for example:
  maintaining its module settings;
  managing the lifecycle of its available versions;
  providing its available actions, indicator state, and host proxy to its module host;
  routing its property state between its module host and its available versions, while managing the reading, writing, and observing of properties;
  providing a means for interconnecting sync modules using submodules.

A sync module's configuration provides the sync module with options to configure modes, versions, and general functionality. For example, in some embodiments, the configuration may includes a module ID, version schema, and other settings.

The version schema is a specification that defines the properties and aspects that may be implemented by a sync module's versions and exposed to the module host via the sync module's host proxy.

Sync modules are associated with other sync modules by setting their module ID to the same value. Sync modules whose module ID have the same value as each other are referred to herein as "module peers."

A version represents a distinct implementation and state instance of the version schema. Each version manages its own synchronization and persistence. Although a sync module's configuration provides parameters to initialize version instances, the version implementation is transparent to the sync module. Versions may, for example, also be responsible for handling conflict resolution and validation.

In some embodiments, there are at least three types of available versions: "private," "public," and "transient." Private versions in a sync module are not synced with, and not visible to, other module peers of that sync module. Public versions in a sync module are synced with, and visible to, other module peers of that sync module. Private versions may, for example, be used for the detached and disconnected peer modes. Public versions may, for example, be used for the joined peer mode. Transient versions may, for example, be used to temporarily hold version state while a peer is merging into another version, responding to a notify on change alert, or any time a temporary ad-hoc version is required. Transient versions may, for example, be created and destroyed transparently by the sync module, without user interaction.

Each version has a unique version identifier and may contain metadata, such as display name, creation time, and modified time.

A sync module contains various version pointer registers, such as the joined version, the detached version, the disconnected version, and the transient version. Each of these registers holds a pointer to an available version. The register modules may be set from the sync module's configuration, available actions, and by events that modify their value. Version pointers are used to route properties to and from available versions based on the property's effective version handle and module settings.

Another type of version handle is "disabled." Properties that are not currently used in a sync module register may be disabled. Disabled versions are hidden from the sync module, are not synchronized or persisted by versions, and are not provided by the host proxy.

In addition to the standard named version pointer registers listed above, a sync module may define one or more custom version pointer registers to be used for application-specific uses. An example of such a custom version pointer register is a transient version pointer register.

As mentioned above, the sync module exposes a host proxy to the sync module's module host. The host proxy routes properties between the module host and one or more available versions, via version pointers that are resolved using each property's effective version handle. (Disabled properties are not exposed by the host proxy.) The sync module effectively decouples the properties of versions from the module host by demultiplexing between the properties of the host proxy and the available versions. This decoupling enables sophisticated and flexible synchronization to be performed and monitored in ways that are not possible with existing systems.

Each sync module has a peer mode that modifies the sync module's default version handle. When the sync module's module mode (described in the next section) is manual_all, each module peer can have a distinct peer mode.

A sync module's default version handle specifies the version handle to use for all properties that do not have a version handle override set.

Each property defined by the version schema has an effective version handle. The effective version handle determines the version pointer register that is used by the property router to route the property to and from an available version. In the case of the "disabled" version handle, there may be no version pointer register.

A sync module's peer mode also determines how the sync module's available actions and indicator state are calculated for each property. For example, a property that has an effective version handle of joined will always have an indicator state of in-sync, and a property that has an effective version handle of disconnected or disabled will not be factored into the sync state calculation. A property that has an effective version handle of detached will be compared against the joined version state's value to determine the sync state of that property.

The following are examples of peer mode routing for various effective version handles:

joined: properties are routed to and from the available version pointed to by the joined version pointer;

detached: properties are routed to and from the available version pointed to by the detached version pointer;

disconnected: properties are routed to and from the available version pointed to by the disconnected version pointer; and disabled: no properties are routed to or from any available version. Additionally, properties having a peer mode of disabled are not exposed to the module host by the host proxy.

Setting the peer mode will adjust the default version handle. Under certain conditions, properties may be routed to and from the version pointed to by the transient version pointer.

Individual properties and aspects may be set to a specific version handle independent of the default version handle. This is referred to as a version handle override. Each sync module may include a list of version handle overrides. Each such version handle override may have its own associated list of properties and/or aspects. A property or aspect that is not included in any of the version handle override lists may be said herein to have its version handle override "not set." In the case of a version handle override of "enabled," any property or aspect that is not included in any of the version handle override lists may be said to have its version handle "disabled." Examples of version handle overrides are listed below:

always_joined: the listed properties and aspects will always be routed to and from the joined version;

always_detached: the listed properties and aspects will always be routed to and from the detached version;

always_disconnected: the listed properties and aspects will always be routed to and from the disconnected version;

always_disabled: the listed properties and aspects will be removed from the version schema (and the host proxy). These properties are never modified or managed by the sync module or its available versions, and will not contribute to the sync module's in-sync indicator state.

enabled: restricts the sync module to managing only the listed properties and aspects. This override may, for example, essentially disable all properties that are not explicitly overridden.

The module mode sets the peer mode of all version peers to the same value. However, when the module mode is set to manual_all, each version peer can select their peer mode independently, according to any module mode restrictions. Examples of module mode values include:

join_all: all current and future version peers are joined;

detach_all: all current and future version peers are detached;

disconnect_all: all current and future version peers are disconnected;

disable_all: all current and future version peers are disabled;

manual_all: each current and future version peer can select its own peer mode; and manual_submodule: a parent module will allow its submodules to each define their module mode settings independently.

The sync module configuration has settings that impose restrictions on the sync module's peer mode and module mode. Examples of these are listed below:

module_mode_locked: prevents the sync module's module mode from being changed;

allow_join: allows or prevents the sync module to be placed in the joined peer mode;

allow_detach: allows or prevents the sync module to be placed in the detached peer mode;

allow_disconnect: allows or prevents the sync module to be placed in the disconnected peer mode;

allow_disable: allows or prevents the sync module to be placed in the disabled peer mode;

allow_notify_on_change: allows module peers to activate the notify on change feature;

allow_version_edit: allows available versions to be created, deleted, and edited. This applies to the lifecycle and configuration of version instances, and not to their actual version state.

The selective synchronization system may provide a "basic sync configuration" in order to facilitate configuration and use of the system without requiring extensive setup. The basic sync configuration may, for example, be implemented as a single public version that is shared between all module peers, and having one private version per module peer. No additional available versions may be defined or selected. In the basic sync configuration, the disconnect mode and disable mode may be turned off, each module peer may be either joined or detached, and the notify on change feature may be disabled. The basic sync configuration simplifies the sync module by limiting available actions, indicator state, module mode choices, and peer mode choices.

The term "sync aspect" or "aspect" refers to a set of zero or more of a version schema's properties. The purpose of a sync aspect is to group the properties within the sync aspect for selection, and to associate indicators and actions with functionality. Sync aspects provide advantages of flexible granularity, simplified architecture, integration with module actions and indicator state, and the ability to be presented and differentiated by a module host's indicators.

Example uses of sync aspects include the following:

A sync module may, for example, be configured to selectively override the version handle for specific aspects of a version schema using the always_joined, always_detached, always_disconnected, always_disabled, and enabled version handle override settings.

The user interface may display an indication of one or more specific aspects, display the sync state of version peers in relation to those specific aspects, and streamline operations by using aspects to manage multiple properties.

Sync aspects may assist submodules in combining properties from aggregated sync modules.

Sync aspects may be used to divide properties within the same sync module into aspects based on some common functionality or other common feature.

Sync aspects may be used to combine or omit properties when using a common version schema from multiple sync modules.

A sync module's indicator state includes details provided by the sync module to the module host pertaining to the condition of the sync module (e.g., the sync module's peers and versions). The module host may convey the indicator state to the user in the form of one or more indicators. A module host may receive indicator state information for each sync module it utilizes.

The module host may use indicators to provide any of a variety of information to the user for any of a variety of purposes. For example, the module host may use indicators to convey, to each user, information such as the module settings of one or more sync modules, the version state of one or more sync modules in relation to one or more of those sync modules' version peers, the aspects being managed by one or more sync modules, the consequences of modifying the version state of one or more sync modules, and additional information related to peers and versions.

An indicator may include any one or more of the following, in any combination: visual output, audible output, tactile output, and message output. Examples of message output include synchronous messages (e.g., popup notifications) and asynchronous messages, such as text messages, SMS messages, email messages, and messages posted to an application (such as a social media application). Any such indicator may provide one or more hints to the user regarding the condition of a sync module (e.g., one or more of its properties and/or aspects) and/or the sync module's module peers.

Some examples of ways in which the selective synchronization system may represent indicators include the following:

visual indicators which use colors, text, icons, sub-icons, borders, font styles, and/or other decorations to represent indicator state;
audible indicators which use sounds, alarms, and/or repeating alerts to represent indicator state;
tactile and/or haptic signals which represent indicator state;
notifications and/or messages which represent indicator state; and
lists and/or reports which represent indicator state.

An indicator may, for example, use a popup message (in addition to or instead of any of the above) to convey to the user which aspect, submodule, peer, or version the indicator refers to.

Indicators may be used when presenting available actions, such as in order to clarify their outcome and to distinguish available actions from each other.

Other examples of uses of indicators include widgets, such as sync buttons and sync module summaries. As mentioned elsewhere herein, a sync button is a button (or other user interface element) that is associated with a sync module and that displays available actions of that sync module when it is activated. The visual content of a sync button may contain or consist of a visual indicator. In some embodiments, each visual indicator has a center icon, additional smaller icons around the perimeter, and various outline styles. The center icon, smaller icons, and outline styles may, individually and/or in combination, represent different indicator states of the corresponding sync module. A visual indicator may, for example, be located in an area related to (e.g., within, adjacent to, or near) the visual output representing the properties that the visual indicator's associated sync module manages, such as in a menu bar, or as a floating action button above content managed by the sync module.

As mentioned elsewhere herein, a sync module may be a parent module that has submodules; The parent module may aggregate the indicator states of all of its submodules using a logical OR to produce the indicator state of the parent module. For example, any submodule with a version peer indicator state of "not-in-sync" may be reflected in the parent module's indicator state, regardless of the version peer indicator state of the parent module's other submodules.

Each sync module provides its module host with a dynamic list of available actions (which may include basic actions and/or composite actions). As this implies, a sync module's available actions may change over time, and the sync module may provide such changing lists of available actions (or subsets thereof) to the sync module's module host as the lists change.

A sync module's module host may invoke actions, from the list of available actions, in response to which the sync module will execute the invoked action(s). Such actions, when executed, may, for example, modify any of the module settings.

The selective synchronization system may filter a sync module's available actions by their applicability and group the sync module's available actions by their effect. A plurality of parameters may be used to identify a sync module's available actions. Such parameters include any of the module settings or the sync module's module peer settings.

For example, if the "notify on change" feature (defined later) is disabled for a sync module, then the only "notify on change" action that will be included in the sync modules available actions list will be enable_notify_on_change_feature. If the "notify on change" feature is enabled for a sync module, but the "notify on change" feature is disabled for a module peer of the sync module, then the only "notify on change" action that will be enabled for that module peer will be enable_notify_on_change.

As mentioned above, the submodule architecture of the selective synchronization system allows for aggregating multiple sync modules into a single sync module. Sync modules may be connected to each other using the submodule architecture in any of a variety of ways. A parent module may aggregate its submodules' modes, available actions, indicator state, and host proxies into a single endpoint. A parent module may further restrict the sync aspects that it manages by overriding the module mode or version handle overrides of its submodules, e.g., by setting the version handle overrides of all of its submodules to always_joined, always_detached, always_disconnected, always_disabled, always_manual, or enabled.

The suggested default submodule aggregation behavior is to:

Perform a logical OR on the indicator states of the parent module's submodules to produce the indicator state of the parent module. If any of the parent module's submodules have a notable active indicator state (e.g., "not-in-sync," "error," "loading," or "in notify on change alert"), then the parent module's indicator state will be set to active.
Synchronize the module mode and peer mode of all of the parent module's submodules, so that all of those submodules have the same module mode and peer mode.
Combine the host proxies of all of the parent module's submodules into an aggregate host proxy of the parent module. As a result, all properties routed to and from the parent module's host proxy will be routed to and from all of the parent module's submodules.

For example, if any of the parent module's submodules have a sync state of not-in-sync, then the sync state of the parent module will be set to not-in-sync. As another example, if the "Reload All" action is invoked on a parent module, then the parent module will invoke the "Reload All" action on all of its applicable submodules in response. As another example, invoking join_all and "Lock Module Mode" on a parent module will set all of the parent module's submodule's module modes to join_all, set all current and future module peers' peer modes to joined, and lock all of the parent module's module modes and the parent module's submodule's module modes.

The selective synchronization system's "notify on change" feature allows the indicator state to be modified when a version peer's joined version state is modified by a version peer.

When a sync module has "notify on change" enabled and its peer mode is "joined," and a version peer of that sync module changes the joined version state, the "notify on change" peer mode of the sync module will become detached and an alert in the sync module's indicator state will be set. While in alert (i.e., while the alert is set in the sync module's indicator state), the sync module will use its transient version pointer instead of its detached version pointer. The sync module's pre-change version state will be copied to the sync module's transient version state if the sync module's alert state was not already active.

Other joined but non notify-on-sync enabled peers will remain joined without indicating any "notify on change" alert, but their indicator state will include:
whether any of their version peers have enabled "notify on change"
their version peer sync state; and
any version peer "notify on change" alert status.

When a "notify on change" alert is active, a user can view, approve, reject, or merge changes that caused the "notify on change" alert to be active, or invoke any available actions the implementation provides.

To aid in the understanding of various embodiments of the selective synchronization system, certain examples of the operation of such embodiments relating to submodule architecture will now be described.

In one embodiment, a system includes a version schema that represents an editable text document and a bookmark list. The bookmark list may contain a plurality of bookmarks, each of which points to a corresponding location or region in the editable text document.

The system may include a single module host, which utilizes two sync modules. Each of the two sync modules manages synchronization of different aspects and properties of the editable text document and the bookmarks. More specifically:
The document's content properties and the bookmark list assign their isVisible property to the Outlet Aspect, the synchronization of which is managed by the first sync module.
The document's content properties are assigned to the Content Aspect, and the bookmark list is assigned to the Accessory Aspect, the synchronization of both of which are managed by the second sync module.
Each of the two sync modules may isolate specific properties by enabling or disabling aspects.

As this example illustrates, embodiments of the selective synchronization system enable different properties/aspects of one or more resources (e.g., the document and bookmarks) to be synchronized distinctly from each other and in different ways than each other. The system may even enable different properties/aspects of a single resource (e.g., the document) to be synchronized distinctly from each other and in different ways from each other. This provides a degree of granularity of control that does not exist in other synchronization systems.

Furthermore, any of a variety of elements of the system may be modified over time to enable the synchronization performed by the system to be dynamic in various ways. For example, the system may perform synchronization of the document and bookmarks in accordance with the sync modules in the state at any particular time. Then, the property(ies)/aspect(s) that are synchronized by one or both of the sync modules may be changed, such as by adding one or more properties/aspects to and/or removing one or more properties/aspects from the properties/aspects that are synchronized by either or both of the sync modules in the system. (Note that, by using aspects to organize properties, additional properties can be added to an aspect without having to change the implementation of the system.) In response to making any such changes, the system may perform any of the functions disclosed herein in accordance with such changes. As this implies, the system may synchronize the document and/or bookmarks differently after such changes have been made to the sync module(s). The ability to make such changes and for the system to automatically change the synchronizations that it performs in response to such changes provides the system, and embodiments of the selective synchronization system generally, with a degree of dynamic flexibility not found in other synchronization systems.

In another embodiment, a system includes a version schema that represents an editable text document and a bookmark list. The bookmark list may contain a plurality of bookmarks, each of which points to a corresponding location or region in the editable text document. The system may operate similarly to the bookmark-synchronizing system described above, except that in the current embodiment the bookmarks are managed by a third sync module. More specifically, the "accessory" aspect may been put into a third sync module, thereby allowing that aspect to be managed separately, unlike in the embodiment described above.

In yet another embodiment, a system may include three version schemas instead of defining aspects, namely:
a first version schema which defines properties of the bookmark list;
a second version schema which defines properties of the contents of the document; and
a third version schema which defines properties of the visible outlets.

This embodiment illustrates that embodiments of the selective synchronization system may perform the same general functions using a single version schema and a plurality of aspects, or a plurality of version schemas, each of which organizes the properties as aspects.

In yet another embodiment, a system includes three version schemas instead of defining aspects. The three version schemas are all related to each other in that they all refer to the same document. The three version schemas, therefore, effectively perform the same function as aspects, but without using the aspects feature of the selective synchronization system.

In a further embodiment, the three version schemas of the previous embodiment and their corresponding sync modules may be aggregated into a single sync module, which is a parent module of the three sync modules. Alternatively, such a system may be implemented without submodules.

Sometimes it is useful to manage common aspects of unrelated resources. In one embodiment, a system includes three separate windows, which are managed by a parent module. Only the Outlet Aspect is enabled in the aggregated sync modules, resulting in the parent module managing just the Outlet Aspect, and leaving the Content Aspect and Overlay Aspects to be managed by the other sync modules. The other sync modules disable the Outlet Aspect, while managing other aspects of their version schemas. Alternatively, each parent module may enable different aspects of common submodules.

Sometimes it is useful to manage all aspects of unrelated entities in a global manner. Ine one embodiment, a system includes a parent sync module, which controls all aspects of three submodules. This parent module provides a single endpoint for setting the module modes of its submodules, viewing the consolidated indicator state of its submodules, disabling its submodules, aggregating available actions from its submodules and providing the aggregated available actions to its module host, and dispatching actions to multiple of its submodules from a single point.

Referring to FIG. 1A, a flowchart is shown of a method 100 performed by one embodiment of the present invention. Referring to FIGS. 2A-2G, diagrams are shown illustrating operations performed on various data elements by the method 100 of FIG. 1A according to one embodiment of the present invention.

Figure 2A:
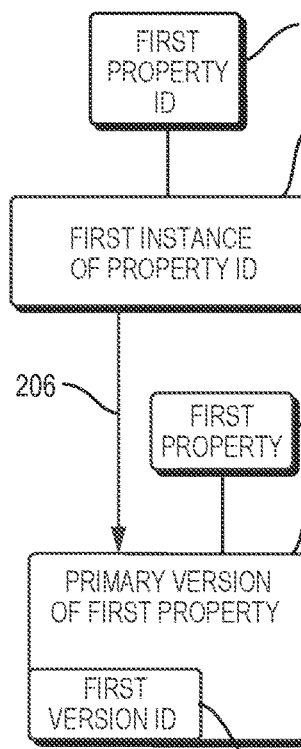
FIGS. 2A-2R illustrate operations performed on various data structures by various embodiments of the present invention.

The method 100 includes mapping a first instance 204 of a first property ID 202 to a primary version 210 of a first property 208, wherein the primary version of the first property 210 has a first version ID 212 (FIG. 1A, operation 102). FIG. 2A shows the resulting mapping 206.

Although FIG. 2A (and other figures herein) show the first property ID 202 to illustrate that the first instance 204 is an instance of the first property ID 202, the first property ID 202 itself may or may not be represented distinctly by any data in embodiments of the present invention. The same is true of other property IDs shown herein.

Similarly, although FIG. 2A (and other figures herein) show the first property 208 to illustrate that the primary version 210 is a primary version of the first property 208, the first property 208 itself may or may not be represented distinctly by any data in embodiments of the present invention. The same is true of other properties shown herein.

As will be seen from the description below, the primary version of the first property 208 may be shared among multiple instances of the first property ID 202, meaning that the primary version of the first property 210 may be the primary version of a plurality of instances of the first property ID 202, such as the first instance 204, the second instance 232, and other instances (not shown) of the first property ID 202. Although the primary version of the first property 210 is referred to herein as the primary version "of the first property," the primary version of the first property 210 is also accurately referred to as "the primary version of the first instance of the first property," "the primary version of the second instance of the first property," and so on for all instances of the first property. The same is true for other properties and their corresponding instances and versions.

Although, for ease of illustration and explanation, instances are shown and described herein as sharing the primary version of the first property 210 (such as by being mapped to the primary version of the first property 210 and by having their effective version handles referencing the primary version of the first property 210), such sharing of the primary version of the first property 210 among multiple instances may be implemented in any of a variety of ways, and does not require, for example, that there be a single copy of the primary version of the first property 210 to which versions are mapped or which are referenced by effective version handles. Alternatively, for example, an embodiment of the present invention may include multiple copies of the primary version of the first property 210, all having the same first version ID 212, in which case all such copies of the primary version of the first property 210 may implement the primary version of the first property 210. In such embodiments, one or more instances of the first property ID 202 may be mapped to one copy of the primary version of the first property 210, while one or more other instances of the first property ID 202 may be mapped to another copy of the primary version of the first property ID 210. All of these is equally applicable to any property and its corresponding instances and versions.

If there are multiple copies of the primary version of the first property 210, then any mechanism may be used to synchronize the version state 222 of those copies. Such synchronization may be performed repeatedly (e.g., continuously) over time to keep such version state synchronized over time. The same is true of any property and its corresponding instances and versions.

Figure 2B:
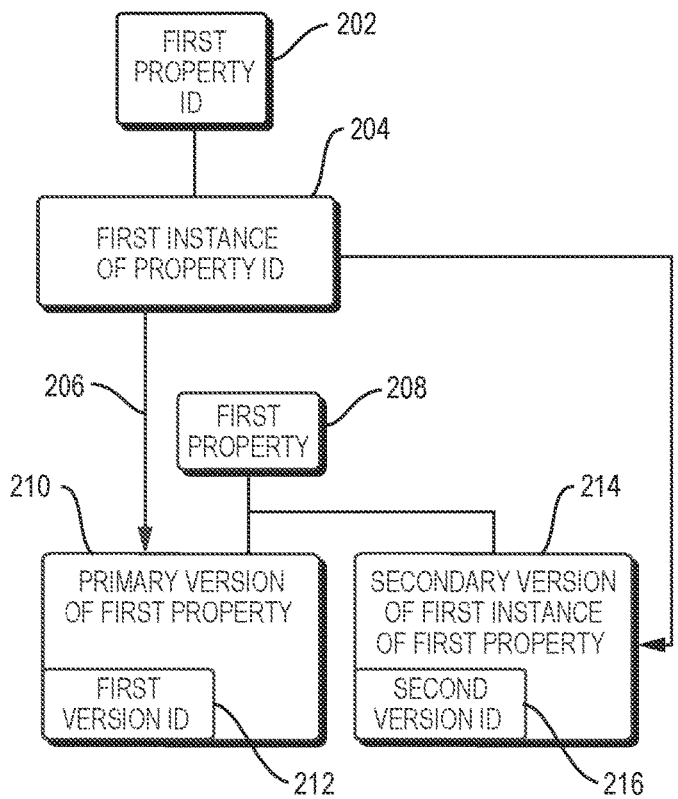

The method 100 includes mapping the first instance 204 of the first property ID 202 to a secondary version 214 of the first instance 204 of the first property ID 202, wherein the secondary version of the first instance of the first property ID 214 has a second version ID 216 (FIG. 1A, operation 104). FIG. 2B shows the resulting mapping 218. As will become clear from the description below, the secondary version of the first instance of the first property ID 214 is not required to be shared with other instances of the first property ID 202, in the sense that the effective version handles of those instances does not have to reference the secondary version of the first instance of the first property ID 214. The same is true of any non-primary version of the first instance of the first property ID 214 (e.g., a ternary version or transient version of the first property ID 214). The same is true generally of non-primary versions of any instance of any property ID.

Figure 2C:
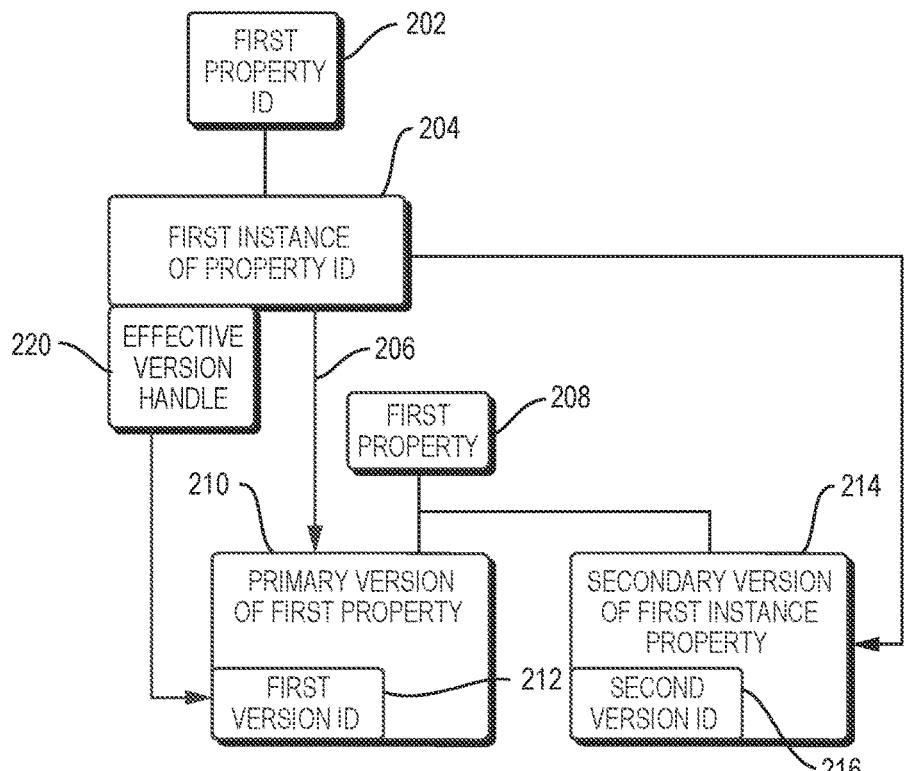

As shown in FIG. 2C, the method 100 includes setting an effective version handle 220 of the first instance 204 of the first property ID 202 to reference the primary version of the first property 210 (FIG. 1A, operation 106).

Figure 2D:
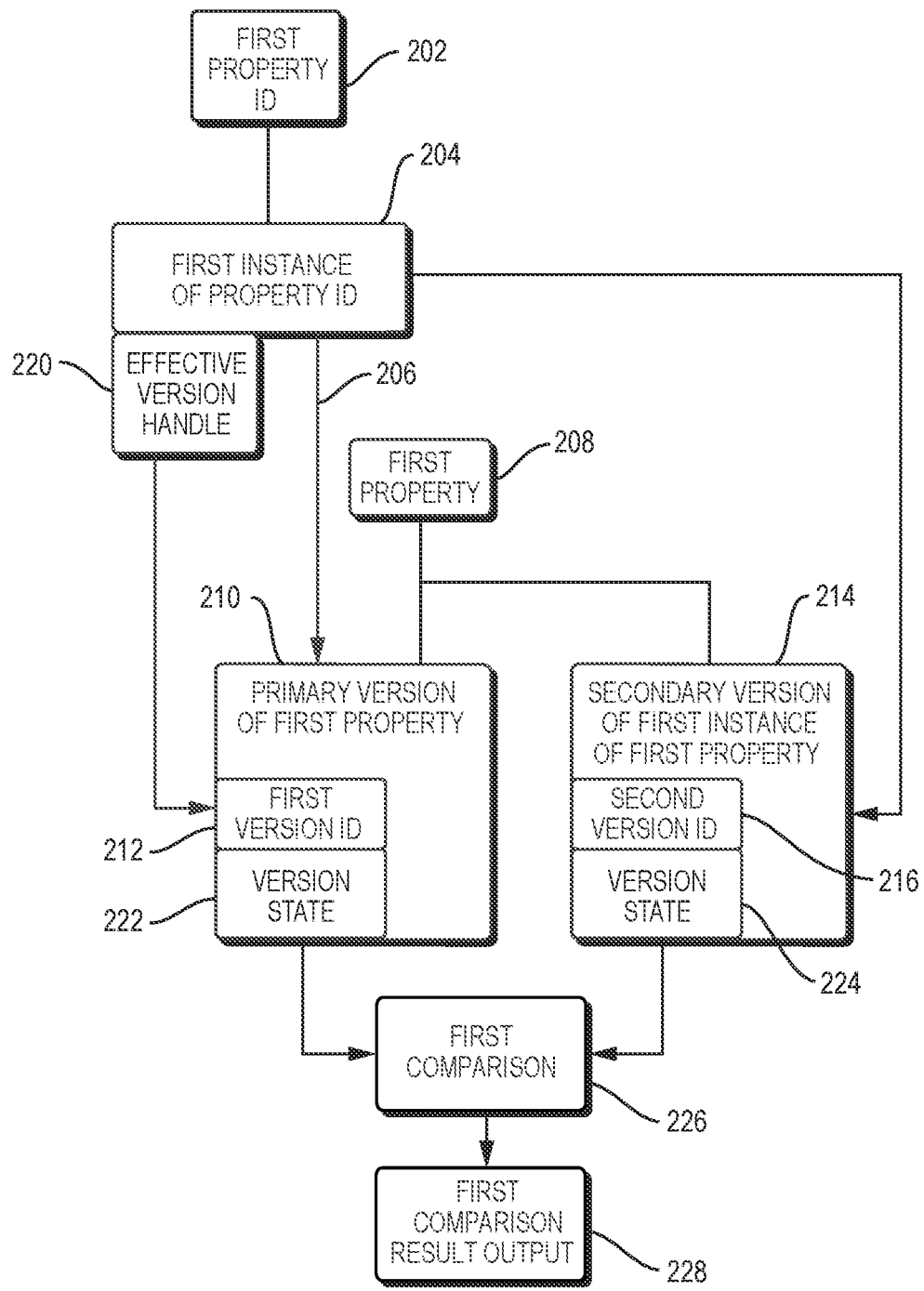

As shown in FIG. 2D, the method 100 includes performing a first comparison 226 of a version state 222 of the primary version of the first property 208 to a version state 224 of the secondary version of the first instance of the first property ID 214 to produce first comparison result output 228 representing a result of the first comparison 226 (FIG. 1A, operation 108).

The first comparison 226 (and other comparisons disclosed herein) may compare the primary version state 222 to the secondary version state 224 to determine whether those states are "equal" to each other according to some operational definition of equality, and the first comparison result output 228 may indicate whether the primary version state 222 is equal to the secondary version state 224 according to the operational definition of equality applied by the first comparison 226. Some examples of operational definitions of equality that the first comparison 226 (and other comparisons disclosed herein) may apply include the following:

Exact binary equality, in which each individual bit of data in the primary version state 222 is compared to the corresponding bit in the secondary version state 224, and in which the first comparison result output 228 indicates "equal" if and only if each bit matches exactly.

Structural equality, in which the focus is on comparing the organizational framework and content of the primary version state 222 and the secondary version state 224, disregarding their physical storage or memory addresses. If both states exhibit identical sequences and structures of elements, they are considered structurally equivalent.

Value equality, where the comparison transcends physical structure to assess whether the primary version state 222 and the secondary version state 224 represent identical values or datasets, notwithstanding their physical format or arrangement. This form of equivalence is akin to determining semantic similarity in varied expressions or formats of data.

Relational equality, which emphasizes the elements' presence and association rather than their sequential arrangement. Here, the primary version state 222 and the secondary version state 224 are deemed to be equal if they contain an identical set of elements, regardless of their order.

Approximate equality, which is useful, for example, when dealing with data involving natural variances or imprecisions. In this case, the primary version state 222 and the secondary version state 224 are considered to be equal if they are within a predefined tolerance range.

As the above-mentioned non-exhaustive examples illustrate, embodiments of the present invention may use any of a variety of operational definitions of equality or equivalence to perform the first comparison 228 (and other comparisons disclosed herein) and thereby to generate the first comparison result output 228. As this implies, the value of the first comparison result output 228 may represent either "equal" or "not equal," as determined by the operational definition of "equal" that is applied by the first comparison 226.

Figure 2E:
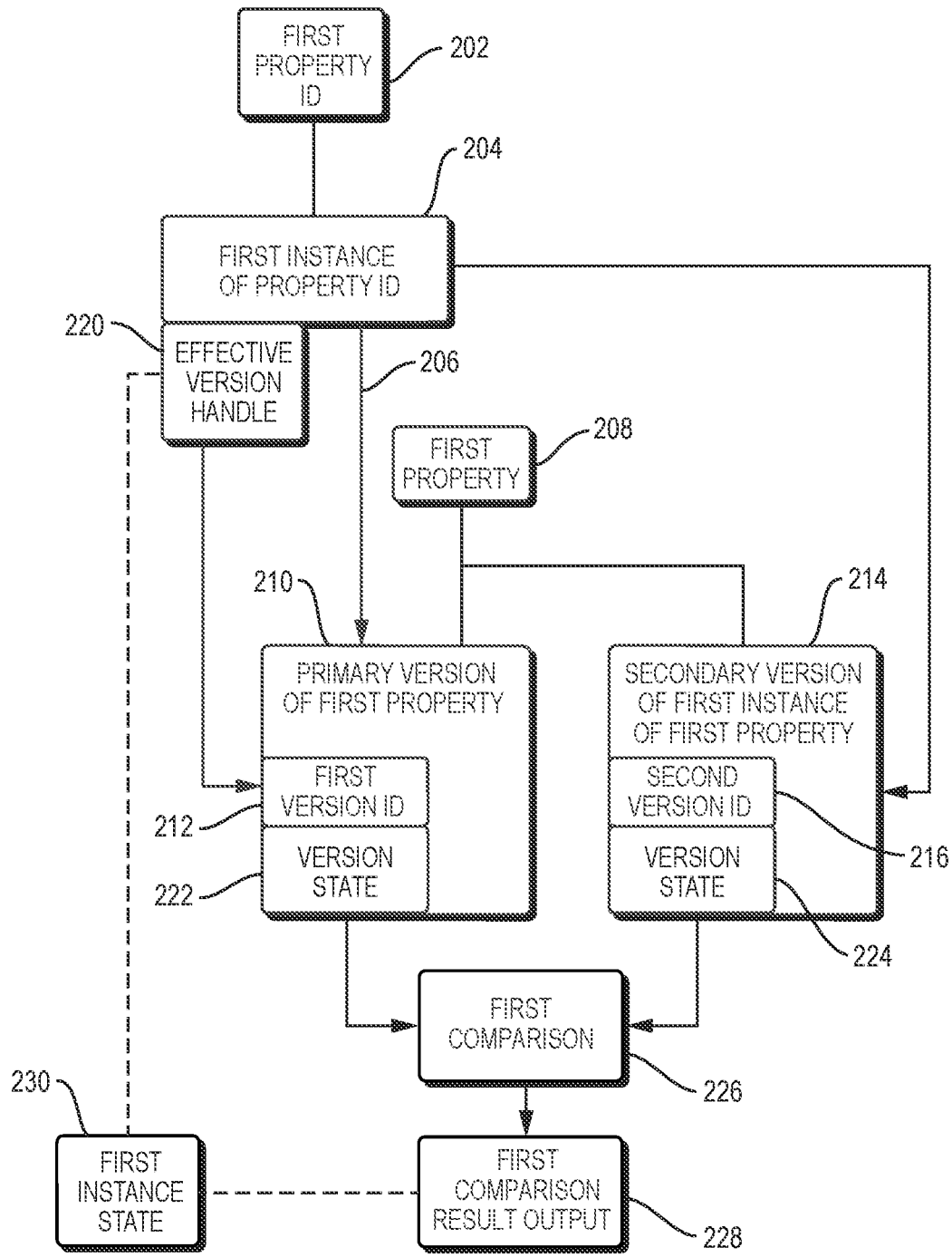

As shown in FIG. 2E, the method 100 also includes exposing a first instance state 230 to indicate: (1) that the effective version handle 220 of the first instance 204 of the first property ID 202 references the primary version of the first property 210; and (2) the first comparison result output 228 (FIG. 1A, operation 110).

Figure 2F:
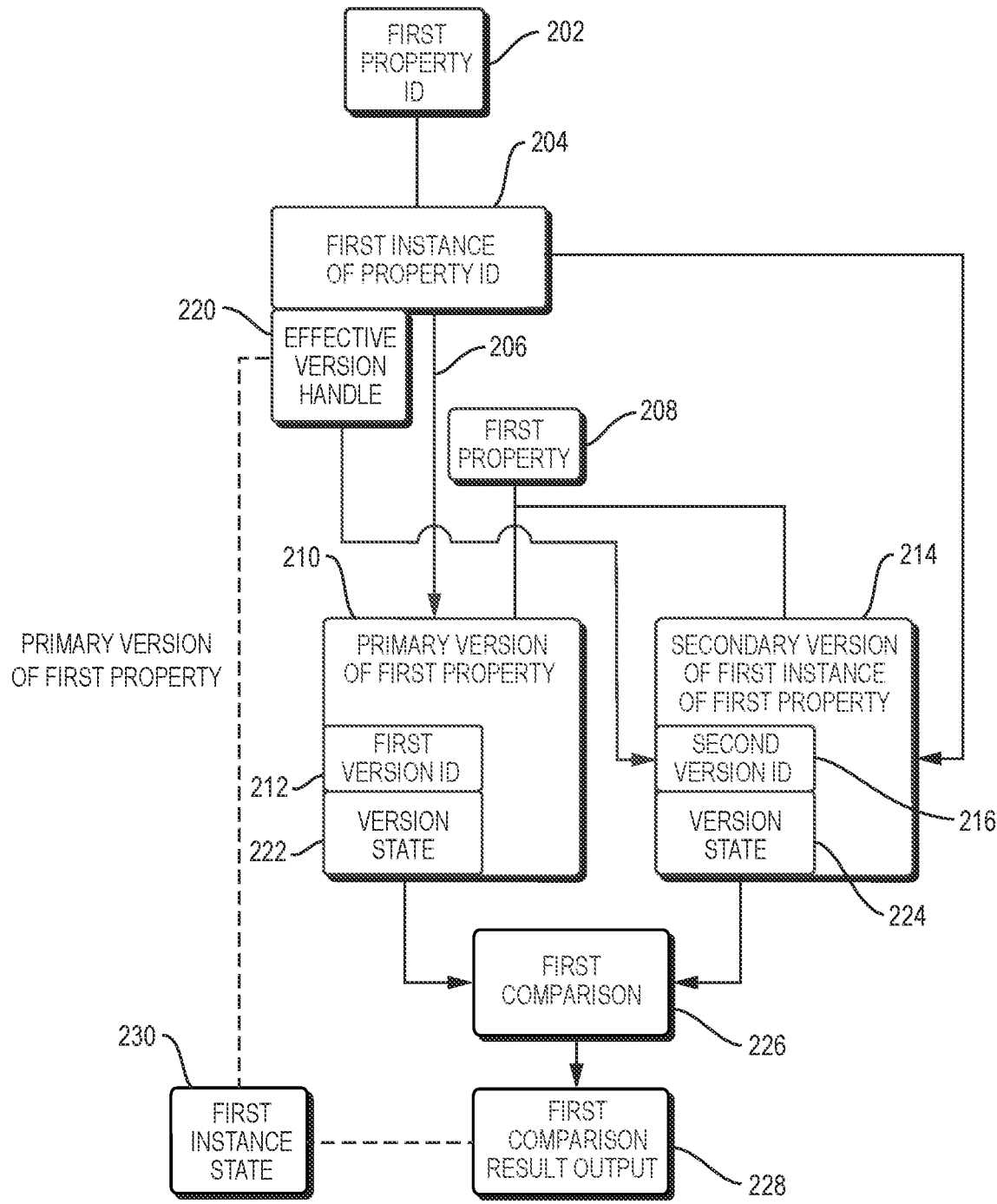

As shown in FIG. 2F, the method 100 also includes setting the effective version handle 220 of the first instance 204 of the first property ID 202 to reference the secondary version of the first instance of the first property ID 214 (FIG. 1A, operation 112).

Figure 2G:
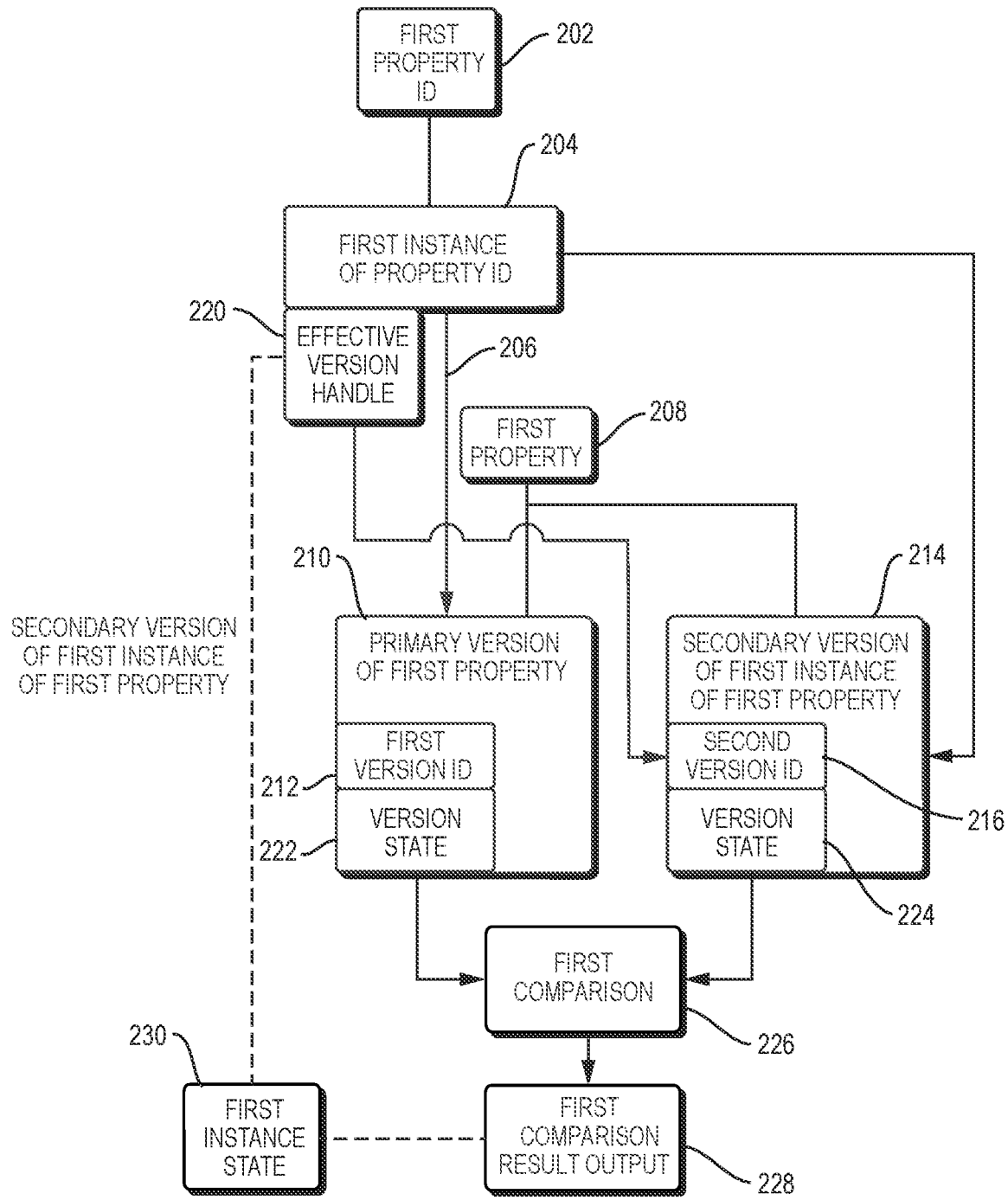

As shown in FIG. 2G, the method 100 also includes exposing the first instance state 230 to indicate: (1) that the effective version handle 220 of the first instance 204 of the first property ID 202 references the secondary version of the first instance of the first property ID 214; and (2) the first comparison result output 228 (FIG. 1A, operation 114).

Figure 1B:
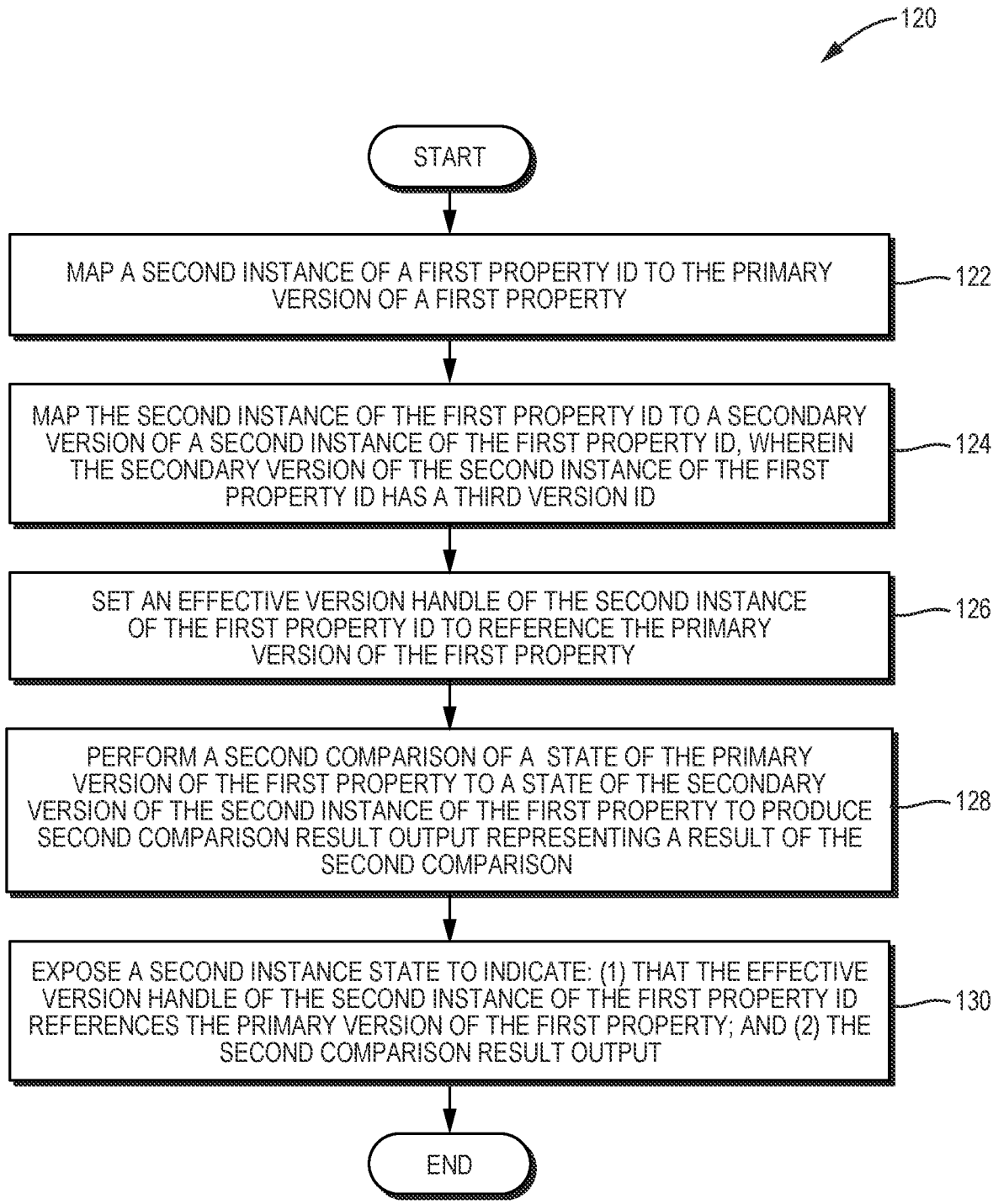

Referring to FIG. 1B, a flowchart is shown of a method 120 performed by one embodiment of the present invention. Referring to FIGS. 2H-2L, diagrams are shown illustrating operations performed on various data elements by the method 120 of FIG. 1B according to one embodiment of the present invention.

Figure 2H:
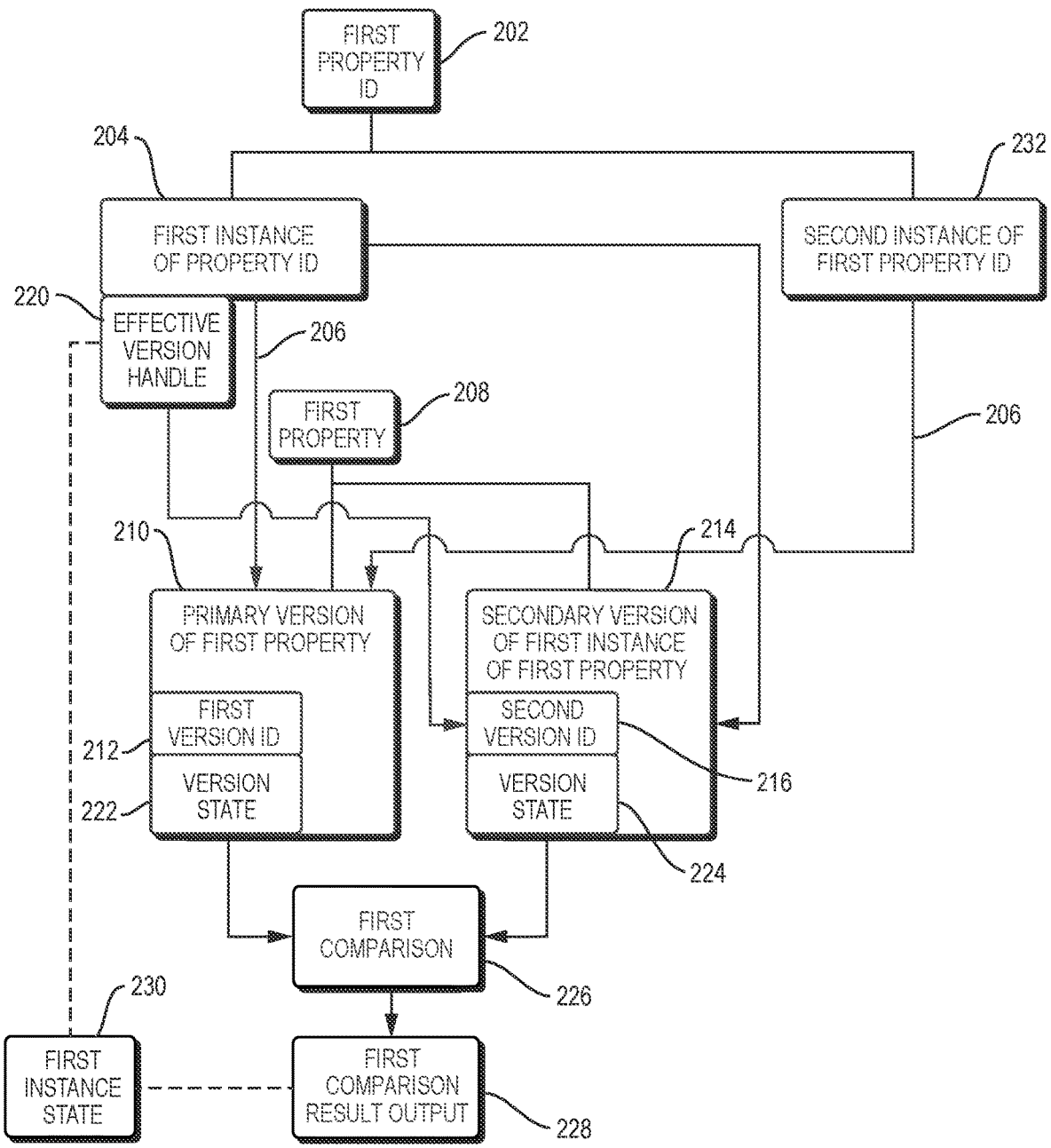
Figure 21:
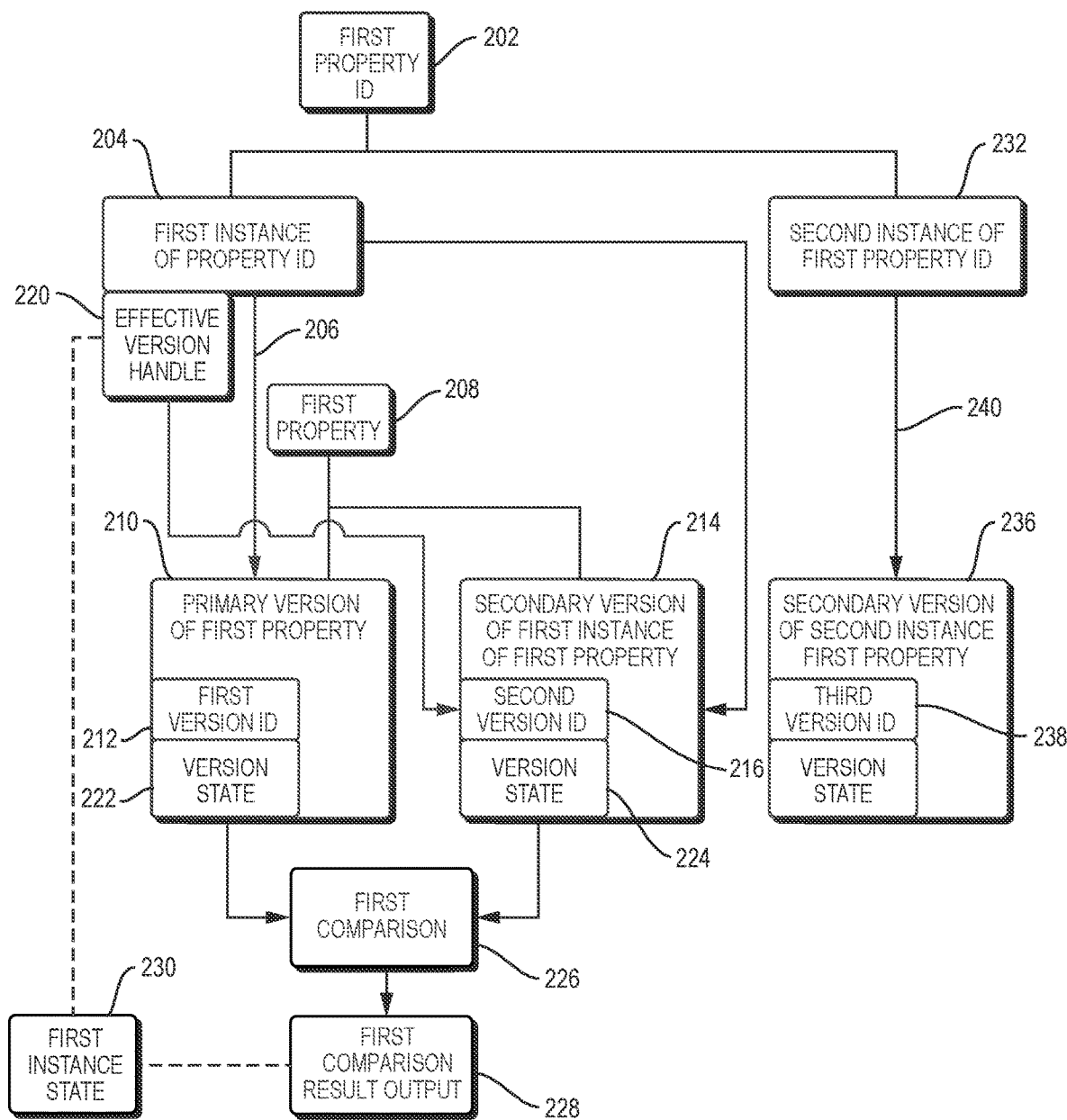

As shown in FIG. 2H, the method 120 includes mapping a second instance 232 of the first property ID 202 to the primary version of the first property 210 (FIG. 1B, operation 122). FIG. 2H shows the resulting mapping 234.

As shown in FIG. 2I, the method 120 includes mapping the second instance 232 of the first property ID 202 to a secondary version of a second instance of the first property ID 236, wherein the secondary version of the second instance of the first property ID 236 has a third version ID 238 (FIG. 1B, operation 124). FIG. 2I shows the resulting mapping 240.

Figure 2J:
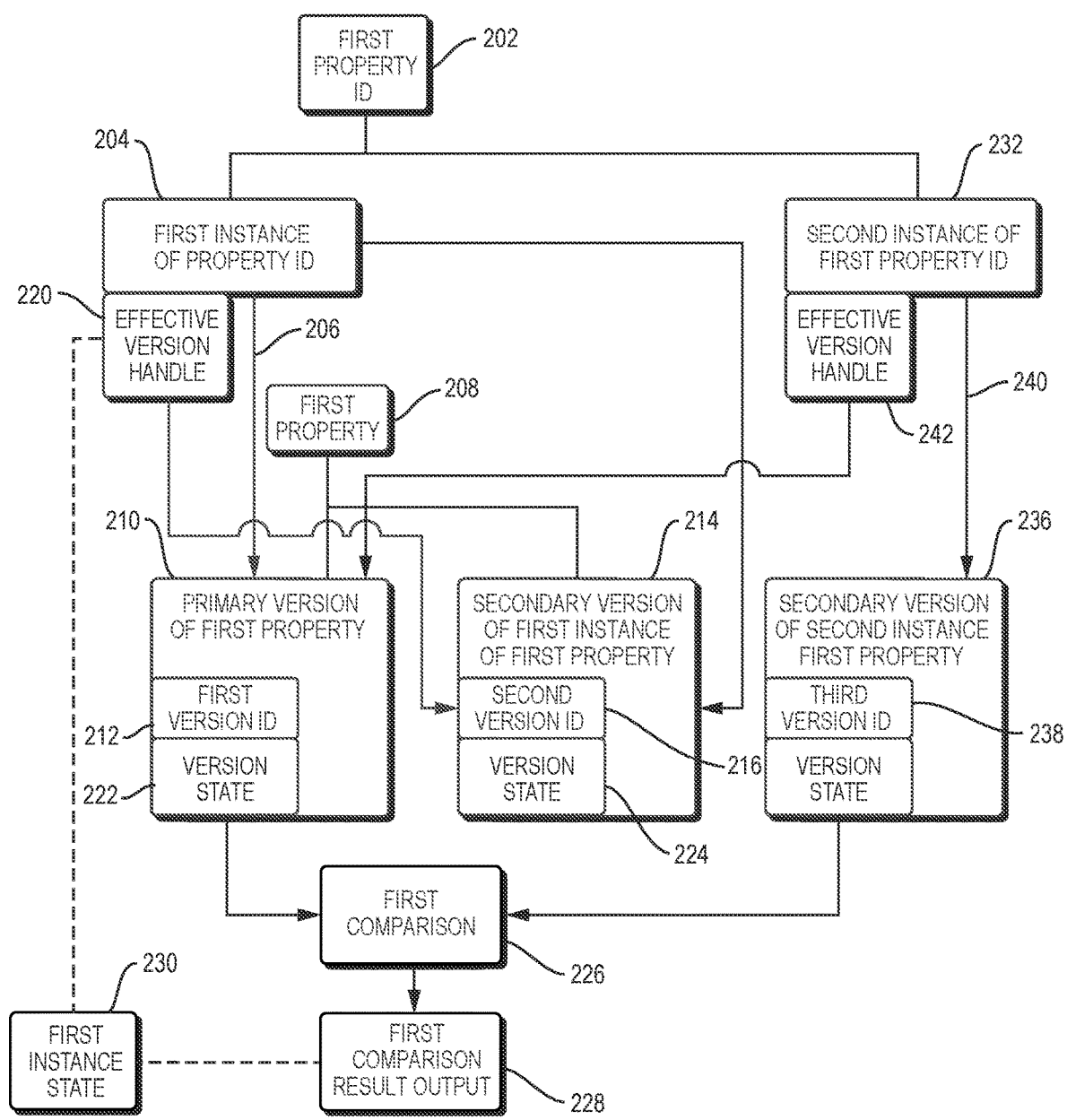

As shown in FIG. 2J, the method 120 includes setting an effective version handle 242 of the second instance 232 of the first property ID 202 to reference the primary version of the first property 210 (FIG. 1B, operation 126).

Figure 2K:
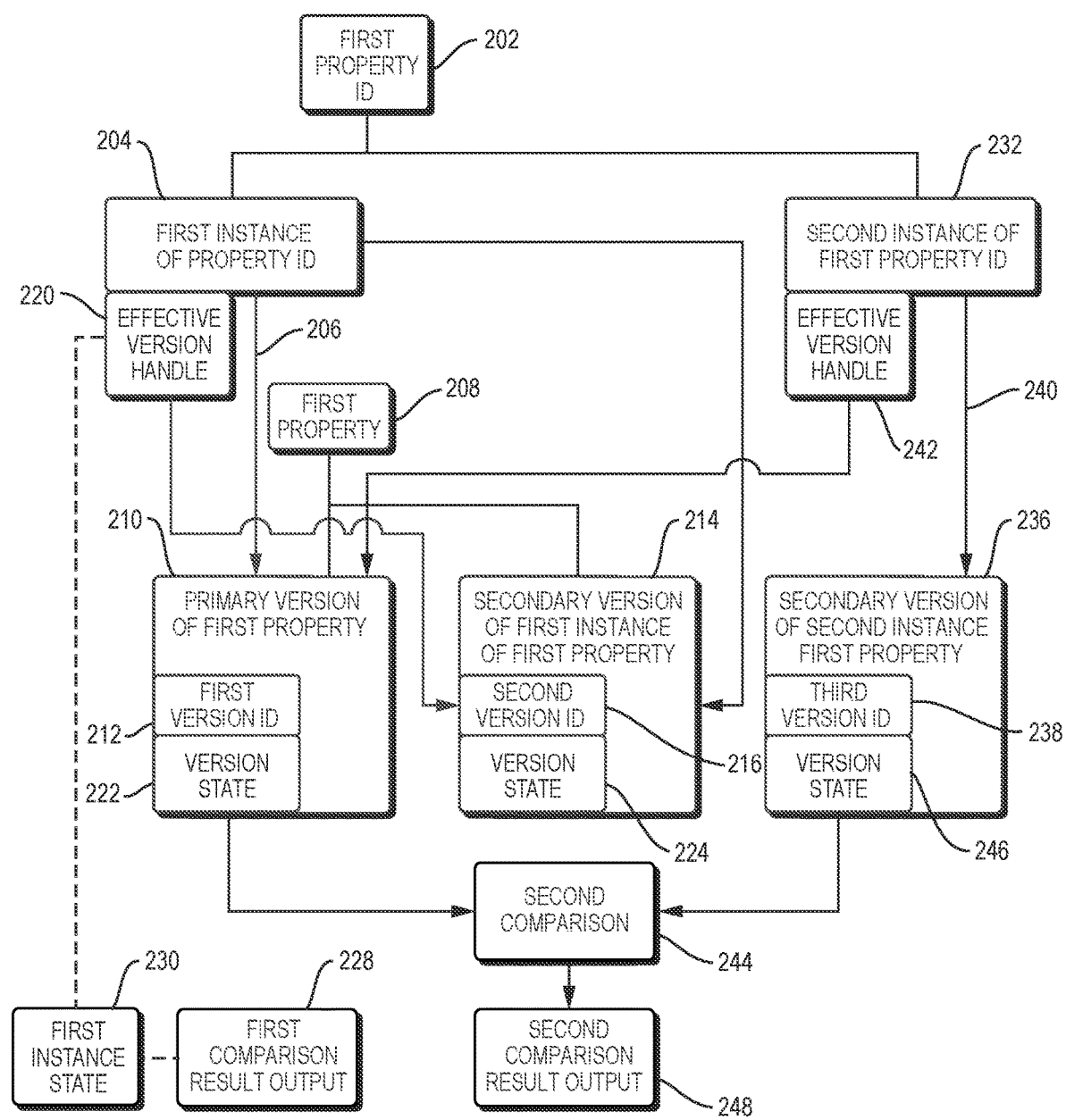

As shown in FIG. 2K, the method 120 includes performing a second comparison 244 of the version state 222 of the primary version of the first property to a version state of the secondary version of the second instance of the first property 236 to produce second comparison result output 248 representing a result of the second comparison 244 (FIG. 1B, operation 128).

Figure 2L:
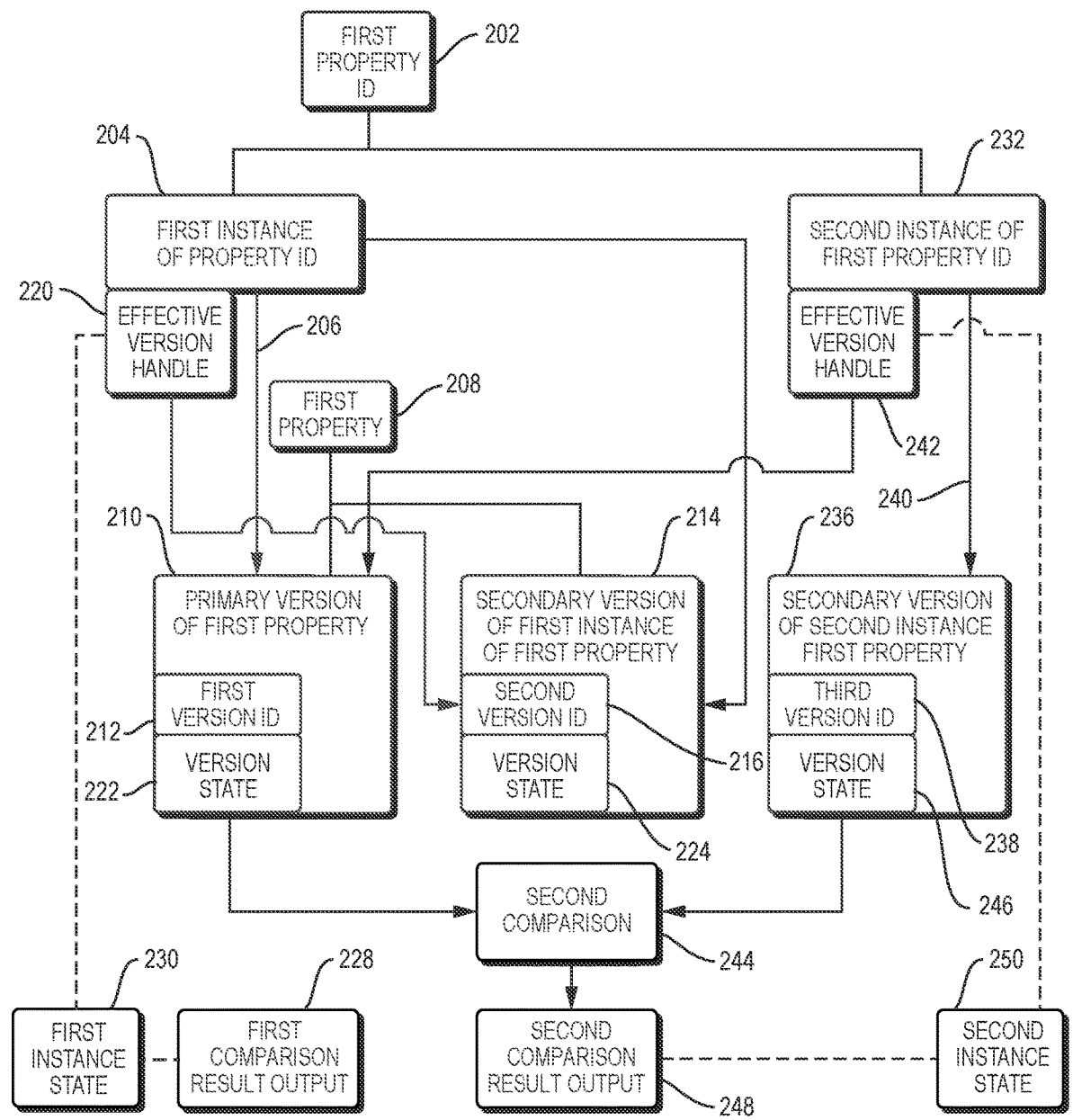

As shown in FIG. 2L, the method 120 includes exposing a second instance state 250 to indicate: (1) that the effective version handle 242 of the second instance 232 of the first property ID 202 references the primary version of the first property 210; and (2) the second comparison result output 248 (FIG. 1B, operation 130). At this point, the second instance 232 of the first property ID 202 is "joined" (i.e., its effective version handle 242 references the primary version of the first property 210), while the first instance 204 of the first property ID 202 is "detached" (i.e., its effective version handle 220 references the secondary version of the first instance of the first property 214) and "in sync" (i.e., the version state 224 of the secondary version of the first instance of the first property 214 is equal to the version state 222 of the primary version of the first property 210).

Figure 1C:
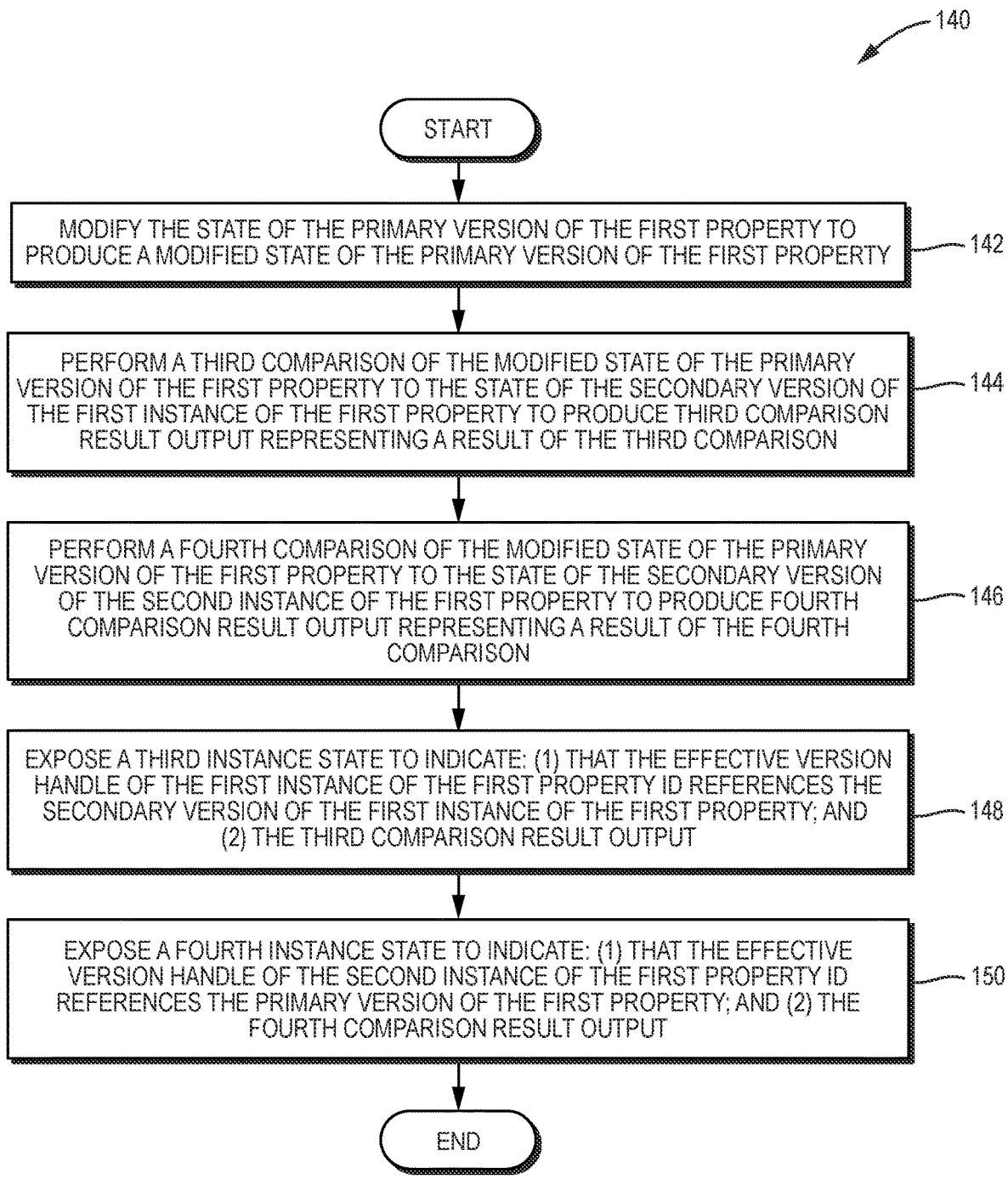

Referring to FIG. 1C, a flowchart is shown of a method 140 performed by one embodiment of the present invention. Referring to FIGS. 2M-2Q, diagrams are shown illustrating operations performed on various data elements by the method 140 of FIG. 1C according to one embodiment of the present invention.

Figure 2M:
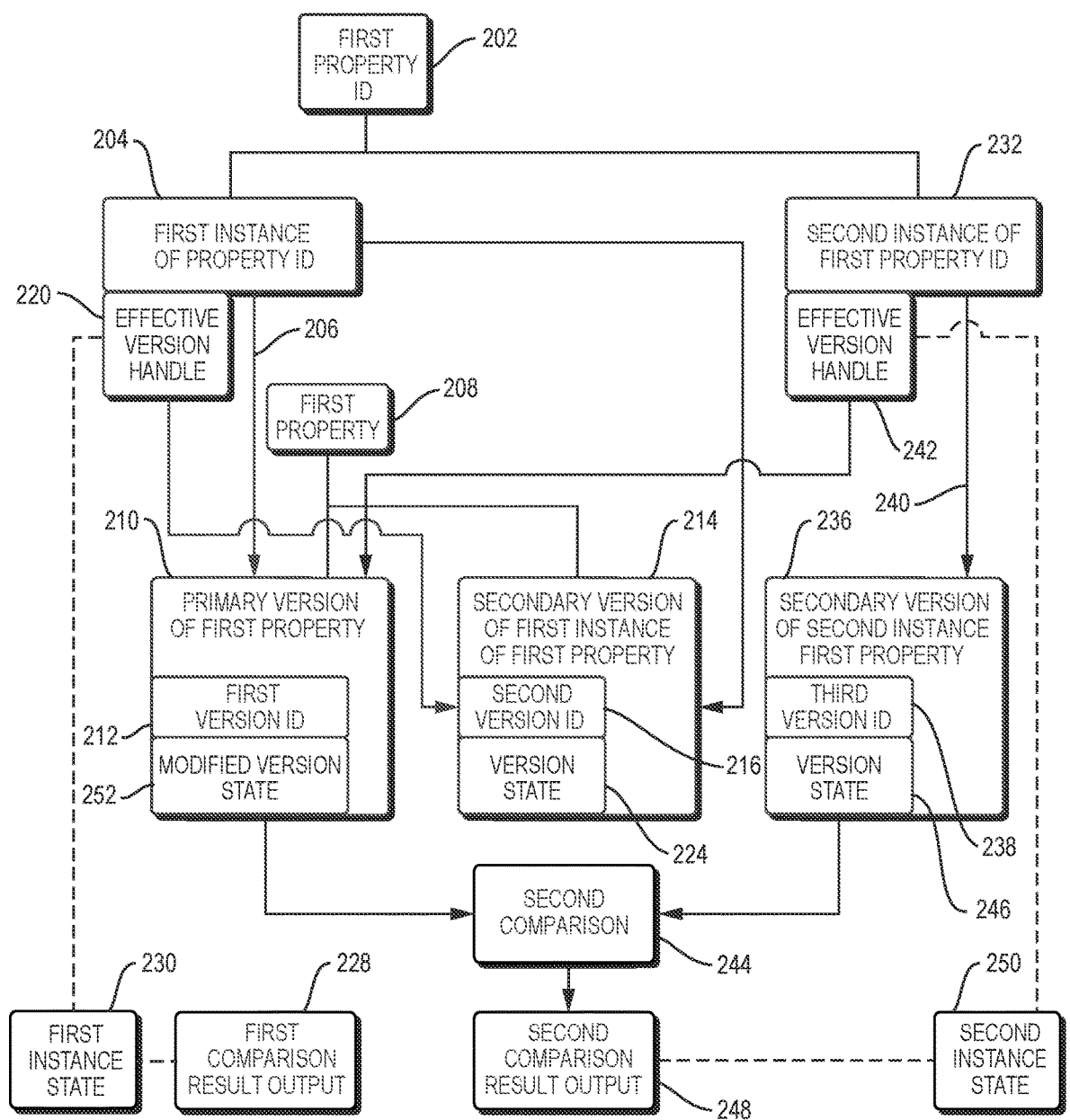

As shown in FIG. 2M, the method 140 includes modifying the version state 222 of the primary version of the first property 210 to produce a modified version state 252 of the primary version of the first property 210 (FIG. 1C, operation 142).

Figure 2N:
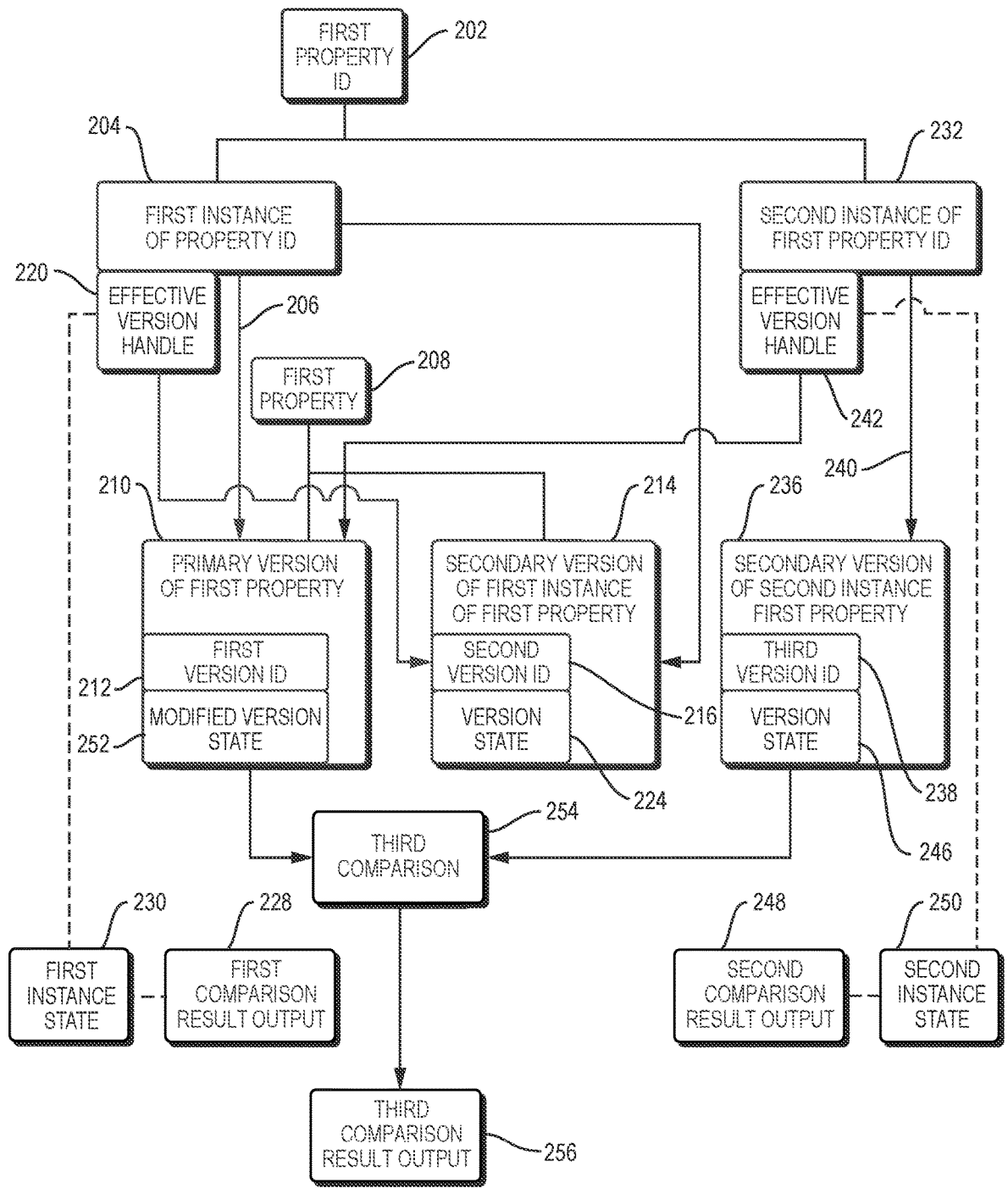
Figure 20:
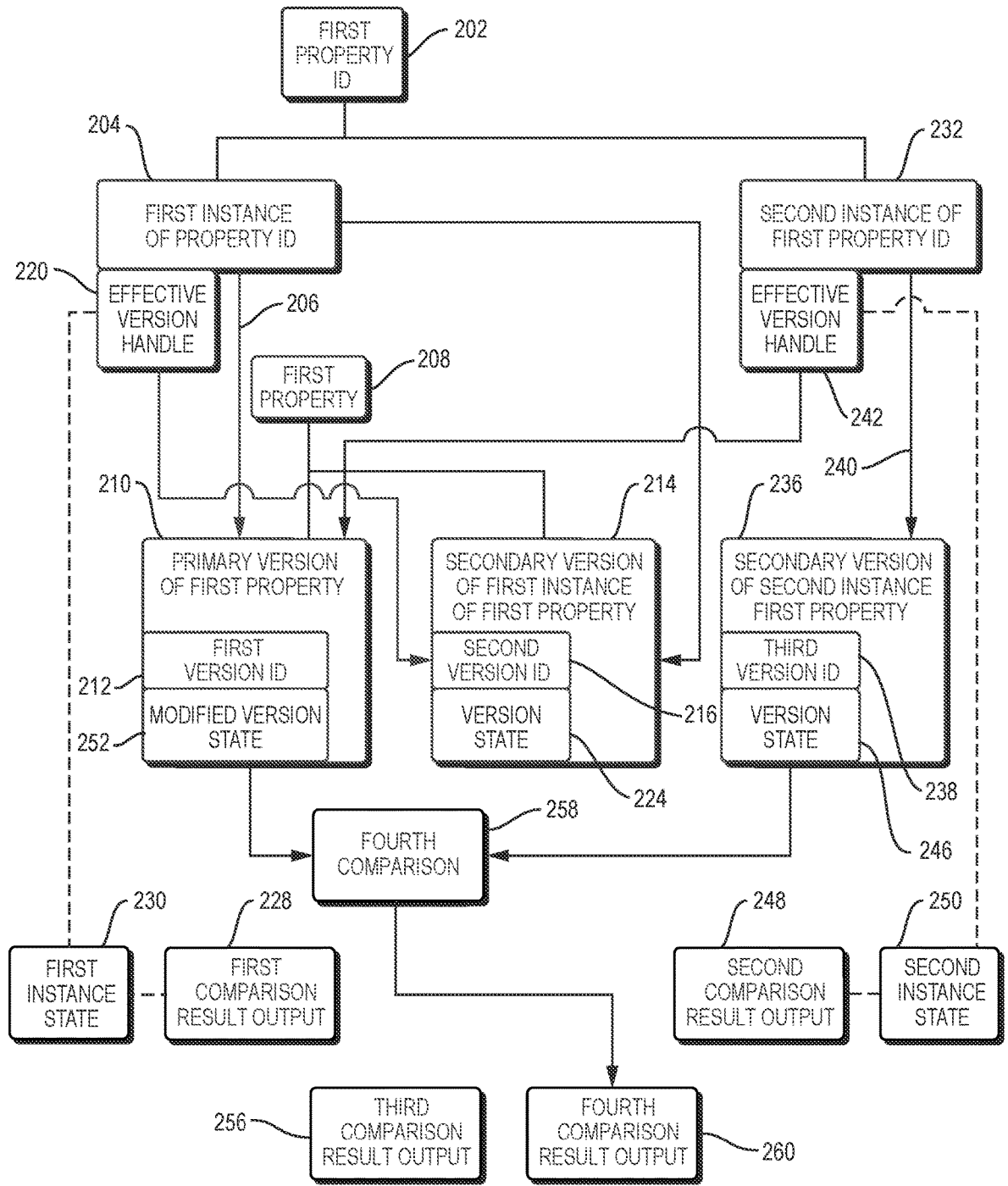

As shown in FIG. 2N, the method 140 includes performing a third comparison 254 of the modified version state 252 of the primary version of the first property 210 to the version state 224 of the secondary version of the first instance of the first property 214 to produce third comparison result output 256 representing a result of the third comparison 254 (FIG. 1C, operation 144).

As shown in FIG. 2O, the method 140 includes performing a fourth comparison 258 of the modified state 252 of the primary version of the first property 210 to the version state 246 of the secondary version of the second instance of the first property 236 to produce fourth comparison result output 260 representing a result of the fourth comparison 258 (FIG. 1C, operation 146).

Figure 2P:
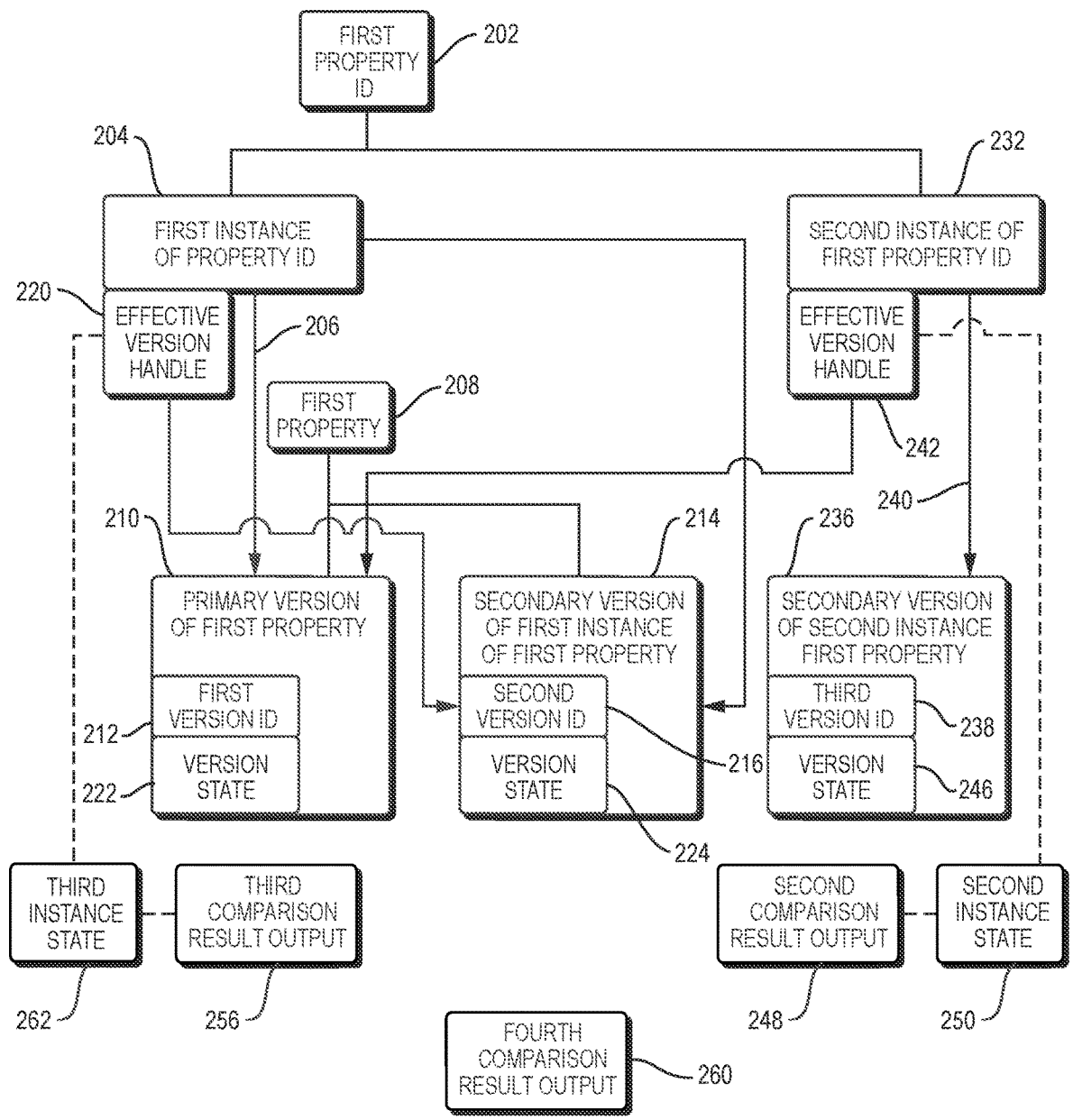

As shown in FIG. 2P, the method 140 includes exposing a third instance state 262 to indicate: (1) that the effective version handle 220 of the first instance 204 of the first property ID 202 references the secondary version of the first instance of the first property 214; and (2) the third comparison result output 256 (FIG. 1C, operation 148).

Figure 2Q:
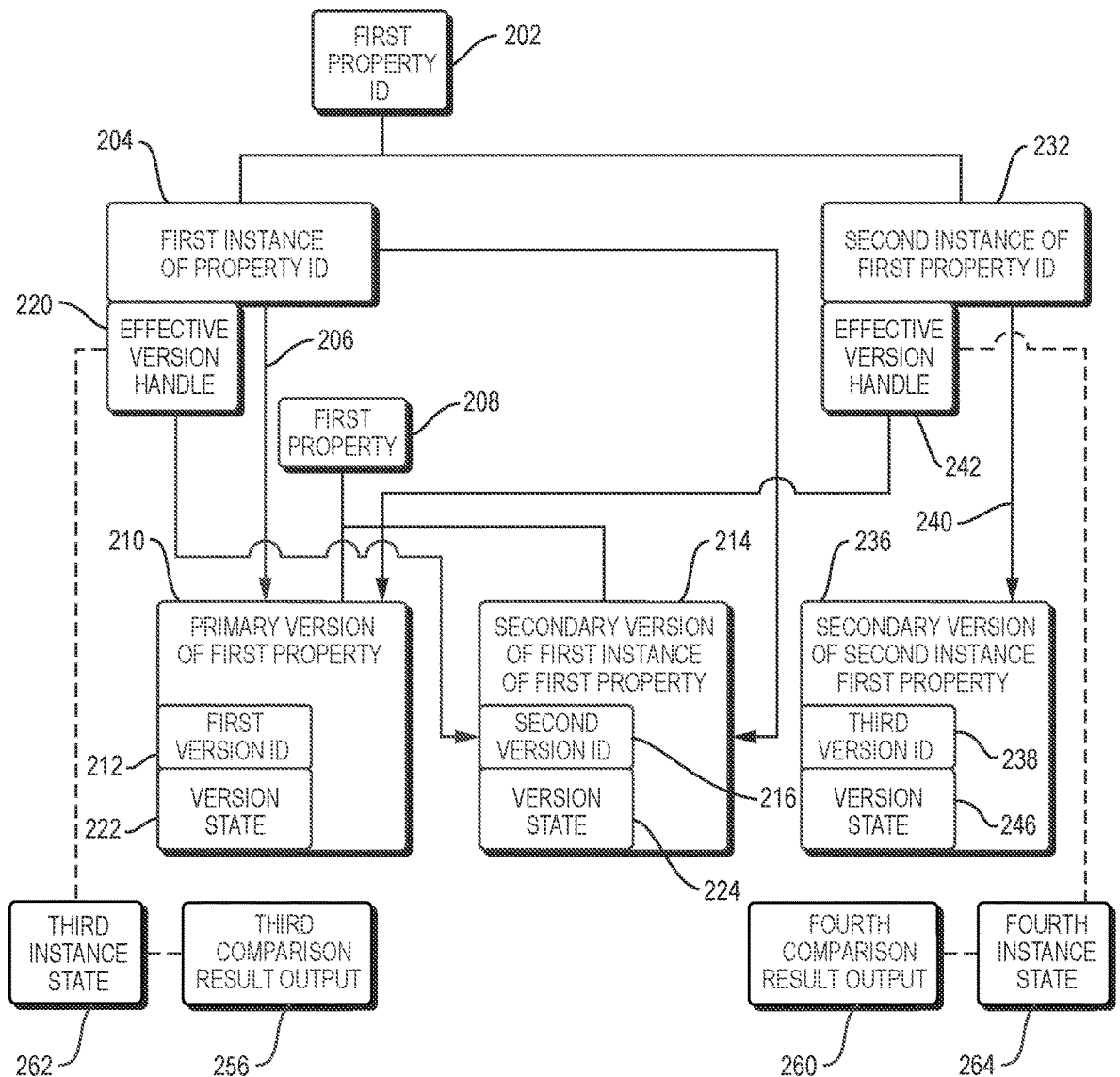

As shown in FIG. 2Q, the method 140 includes exposing a fourth instance state 264 to indicate: (1) that the effective version handle 242 of the second instance 232 of the first property ID 202 references the primary version of the first property 210; and (2) the fourth comparison result output 260 (FIG. 1C, operation 150). At this point, the second instance 232 of the first property ID 202 is "joined" (i.e., its effective version handle 242 references the primary version of the first property 210) and not "not in sync" (i.e., the version state of the secondary version of the second instance of the first property 236 is not equal to the version state 222 of the primary version of the first property 210), while the first instance 204 of the first property ID 202 is "detached" (i.e., its effective version handle 220 references the secondary version of the first instance of the first property 214) and "not in sync" (i.e., the version state 224 of the secondary version of the first instance of the first property 214 is not equal to the version state 222 of the primary version of the first property 210).

Any of the methods disclosed herein may further include: setting the effective version handle 220 of the first instance 204 of the first property ID 202 to reference the primary version of the first property 210; and exposing a fifth instance state to indicate: (1) that the effective version handle 220 of the first instance 204 of the first property ID 202 references the primary version of the first property 210; and (2) the third comparison result output 256. At this point, the effective version handles of the first instance 204 of the first property ID 202 and the second instance 232 of the first property ID 202 point to the same version (namely, the primary version of the first property 210), and both the first instance 204 of the first property ID 202 and the second instance 232 of the first property ID 202 are "out of sync" because the modified version state 252 of the primary version of the first property 210 is not equal to either the version state 224 of the secondary version of the first instance of the first property 214 or to the version state of the secondary version of the second instance of the first property 236. However, the first instance 204 of the first property ID 202 and the second instance 232 of the first property ID 202 are "in sync" with each other because their respective states 224 and 236 are equal to each other.

Any of the methods disclosed herein may further include: manifesting output, via a user interface, representing the fifth instance state, the output including visual output indicating: (1) that the effective version handle 220 of the first instance 204 of the first property ID 202 references the primary version of the first property 210; and (2) the third comparison result output 256. As used herein, the term "manifesting" in reference to any data refers to generating output to a user, via a user interface of any kind, based on that data. Manifesting data may, for example, include generating visual (e.g., text, image, light, and/or video) output, audio output, haptic output, or any combination thereof, via a user interface, based on the data.

Any of the methods disclosed herein may further include: manifesting output, via a user interface, representing the third instance state 262, the output representing the third instance state including visual output indicating: (1) that the effective version handle 220 of the first instance 204 of the first property ID 202 references the secondary version of the first instance of the first property 214; and (2) the third comparison result output 256.

Any of the methods disclosed herein may further include: manifesting output, via a user interface, representing the fourth instance state 264, the output representing the fourth instance state 264 including visual output indicating: (1) that the effective version handle 242 of the second instance 232 of the first property ID 202 references the primary version of the first property 210; and (2) the fourth comparison result output 260.

Figure 2R:
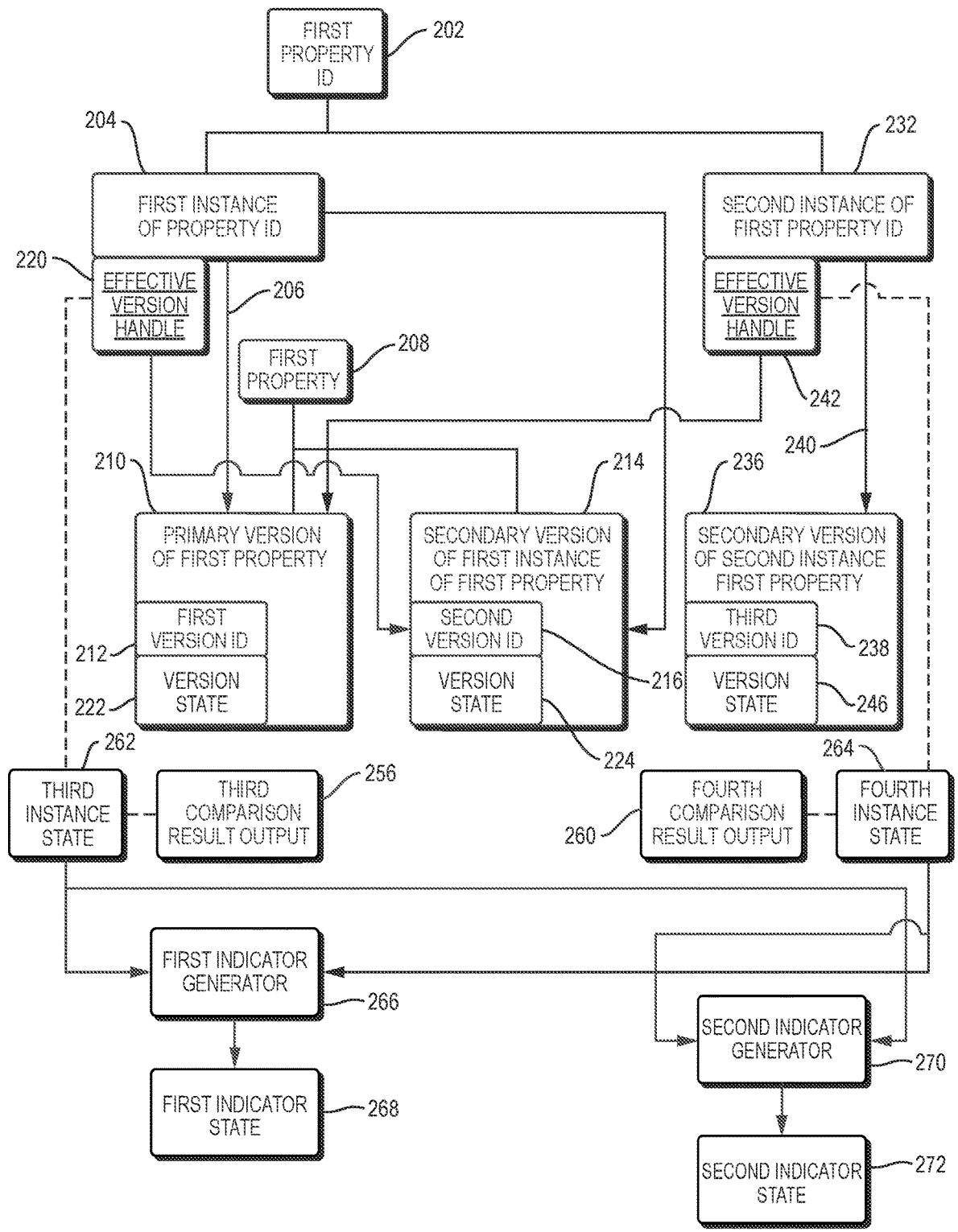

As illustrated in FIG. 2R, any of the methods disclosed herein may further include: generating, at a first indicator generator 266, a first indicator state 268 based on the third instance state 262 and the fourth instance state 264, wherein the first indicator state 268 represents the third instance state and the fourth instance state. Generating the first indicator state 268 may further include generating the first indicator 268 state to further indicate that a notify-on-change mode of the first instance 204 of the first property ID 202 is enabled.

As further illustrated in FIG. 2R, any of the methods disclosed herein may further include: generating, at a second indicator generator 270, a second indicator state 272 based on the third instance state 262 and the fourth instance state 264, wherein the second indicator state 272 represents the third instance state and the fourth instance state. Generating the second indicator state 272 may further include generating the second indicator state 272 to further indicate that a notify-on-change mode of the first instance 204 of the first property ID 202 is enabled.

Any of the methods disclosed herein may further include: determining whether the effective version handle 220 of the first instance 204 of the first property ID 202 indicates that the third comparison result output 256 should be reflected in the second indicator state 272; in response to determining that the effective version handle 220 of the first instance 204 of the first property ID 202 indicates that the third comparison result output 256 should not be reflected in the second indicator state 272, generating the second indicator state 272 to represent the first instance state 230, the fourth comparison result output 260, and the second instance state 250; and in response to determining that the effective version handle 220 of the first instance 204 of the first property ID 2022 indicates that the third comparison result 256 output should be reflected in the second indicator state 272, generating the second indicator state 272 to represent the first instance state 230, the fourth comparison result output 260, the second instance state 250, and the third comparison result output 256.

Any of the methods disclosed herein may further include: exposing the first instance state 230 to further indicate that a notify-on-change mode of the first instance 204 of the first property ID 202 is enabled.

Any of the methods disclosed herein may further include: in response to a host of the second instance 232 of the first property ID 202 modifying the version state 252 of the primary version of the first property 210 to produce a modified version state 252 of the primary version of the first property 210: making a copy of the version state 222 of the primary version of the first property 210, thereby producing a transient version of the first property; and setting the effective version handle 220 of the first instance 204 of the first property ID 202 to reference the transient version of the first property. Furthermore, in response to the host of the second instance 232 of the first property ID 202 modifying the version state 252 of the primary version of the first property 210 to produce the modified version state 252 of the primary version of the first property 210, any of the methods disclosed herein may include: generating the second indicator state 272 to further indicate that the effective version handle 220 of the first instance 204 of the first property ID 202 references the transient version of the first property; and generating the second indicator state 272 to further indicate that the effective version handle 220 of the first instance 204 of the first property ID 202 references the transient version of the first property because the version state 222 of the primary version of the first property 222 was modified by the host of the second instance 232 of the first property ID 202. Furthermore, in response to the host of the second instance 232 of the first property ID 202 modifying the version state of the primary version of the first property 210 to produce the modified version state 252 of the primary version of the first property 210, any of the methods disclosed herein may include: generating the first indicator state 268 to further indicate that the effective version handle 220 of the first instance 204 of the first property ID 202 references the transient version of the first property because the version state 222 of the primary version of the first property 210 was modified by the host of the second instance 232 of the first property ID 202.

Any of the methods disclosed herein may further include: manifesting output, via a user interface, representing the second instance state 250, the output including visual output indicating: (1) that the effective version handle 242 of the second instance 232 of the first property ID 202 references the primary version of the first property 210; and (2) the second comparison result output 248.

Any of the methods disclosed herein may further include: identifying a set of available actions based on the first instance state 230 and the second instance state 250.

Any of the methods disclosed herein may further include: in response to a command from a host to set the effective version handle 220 of the first instance 204 of the first property ID 202 and the effective version handle 242 of the second instance 232 of the first property ID 202 to a common value, setting the effective version handle 220 of the first instance 204 of the first property ID 202 and the effective version handle 242 of the second instance 232 of the first property ID 202 to reference the primary version of the first property 210.

Any of the methods disclosed herein may further include: setting the effective version handle of the first instance of the first property ID to reference the secondary version of the first instance of the first property ID; setting the effective version handle of the second instance of the first property ID to reference the secondary version of the second instance of the first property ID.

Any of the methods disclosed herein may further include: dereferencing the effective version handle of the second instance of the first property ID 242 to identify an effective version of the second instance of the first property ID 232; and generating the second indicator state 272 to indicate that at least one of the first instance of the first property ID 202 and a third instance of the first property ID does not reference the effective version of the second instance 232 of the first property ID 202.

Any of the methods disclosed herein may further include: dereferencing the effective version handle 242 of the second instance 232 of the first property ID 202 to identify an effective version of the second instance 232 of the first property ID 202; and generating the second indicator state 272 to indicate that both of the first instance 204 of the first property ID 202 and a third instance of the first property ID reference the effective version of the second instance of the first property ID.

Any of the methods disclosed herein may further include: receiving a request for a version state of the first instance 204 of the first property ID 202; and responding to the request for the version state of the first instance 204 of the first property ID 202, the responding comprising: identifying a version of the first instance 204 of the first property ID 202 to which the first instance 204 of the first property ID 202 is mapped; identifying a version state of the version of the first instance 204 of the first property ID 202 to which the first instance 204 of the first property ID 202 is mapped; and responding to the request for the version state of the first instance of the first property ID 204 with the state of the version of the first instance 204 of the first property ID 202 to which the first instance 204 of the first property ID 202 is mapped.

Any of the methods disclosed herein may further include: receiving a request to modify a version state of the first instance 204 of the first property ID 202, the request including a value; and processing the request to modify the version state of the first instance 204 of the first property ID, the processing comprising: identifying a version of the first instance of the first property ID 202 to which the first instance 204 of the first property ID 202 is mapped; identifying a version state of the version of the first instance 204 of the first property ID 202 to which the first instance of the first property ID 202 is mapped; and modifying the version state of the version of the first instance 204 of the first property ID 202 to which the first instance 204 of the first property ID 202 is mapped based on the value.

In any of the methods disclosed herein, a first host may expose the first instance state, a second host may expose the second instance state, and the second host may provide a request to modify a version state of the first instance 204 of the first property ID 202 to the first host, which may receive and process the request.

Any of the methods disclosed herein may further include: manifesting output, via a user interface, representing the first instance state 230, the output including visual output indicating: (1) that the effective version handle 220 of the first instance 204 of the first property ID 202 references the secondary version of the first instance of the first property 214; and (2) the first comparison result output 228.

Any of the methods disclosed herein may further include: mapping a first instance of a second property ID to a primary version of a second property, the primary version of the second property having a fourth version ID; setting the effective version handle 220 of the first instance 204 of the first property ID 202 to reference the primary version of the first property 210; and setting an effective version handle of the first instance of the second property ID to reference the primary version of the second property.

Any of the methods disclosed herein may further include: setting the effective version handle 220 of the first instance 204 of the first property ID 202 to reference the secondary version of the first instance of the first property 214; and setting the effective version handle of the first instance of the second property ID to reference a secondary version of a first instance of the second property.

In any of the methods disclosed herein, the effective version handle 242 of the second instance 232 of the first property ID 202 may reference a secondary version of the second instance of the first property ID 236; and the method may further comprise: setting the version state of the version of the first property referenced by the second instance 232 of the first property ID 202 to be equal to the version state of the version of the first property referenced by the effective version handle 220 of the first instance 204 of the first property ID 202.

In any of the methods disclosed herein, wherein the effective version handle 242 of the second instance 232 of the first property ID 202 references the secondary version of the second instance 232 of the first property ID 236; and the method may further include: setting the version state of the version of the first property ID referenced by the effective version handle 220 of the first instance 204 of the first property ID 202 to be equal to the version state of the version of the first property ID referenced by the effective version handle 242 of the second instance 232 of the first property ID 202.

Any of the methods disclosed herein may further include: setting the effective version handle 220 of the first instance 204 of the first property ID 202 to reference the primary version of the first property 210; and generating the first indicator state 268 to indicate that at least one of a version state of a version of the first property referenced by the second instance of the first property ID and a version state of a version of the first property referenced by a third instance of the first property ID is not equal to the version state of the primary version of the first property 210; wherein the effective version handle of the second instance of the first property ID references the secondary version of the second instance of the first property ID; and wherein an effective version handle of the third instance of the first property ID references a secondary version of the third instance of the first property ID.

Any of the methods disclosed herein may further include: setting the effective version handle 220 of the first instance 204 of the first property ID 202 to reference the primary version of the first property 210; and generating the first indicator state 268 to indicate that both of a version state of a version of the first property referenced by a second instance of the first property ID and a version state of a version of the first property referenced by a third instance of the first property ID are equal to the version state of the primary version of the first property 222; wherein an effective version handle of the second instance of the first property ID references a secondary version of the second instance of the first property ID; and wherein an effective version handle of the third instance of the first property ID references a secondary version of the third instance of the first property ID.

Embodiments of the present invention have a variety of advantages, which include, but are not limited to, the following. Any particular embodiment of the present invention may not have all of the advantages described below.

Although various systems exist which enable the contents of a resource (e.g., file) to be synchronized across hosts, such services only provide synchronization for the contents of the resource, not for other aspects of the resource, such as if, how, and where the resource is displayed, the format and style of the resource, the section of the resource being viewed, and related aspects, such as bookmarks, pointers, comments and overlays. In contrast, embodiments of the present invention enable any one or more such aspects of a resource to be synchronized across a plurality of hosts, and for the particular aspects to be synchronized to be selected and changed over time.

Furthermore, existing synchronization systems do not enable users to manage multiple public and private versions of resources, with or without synchronization or collaboration, in realtime. Embodiments of the present invention provide users with the flexibility to work on a particular resource either collaboratively (i.e., with synchronization of one or more aspects of that resource enabled) or offline (i.e., without synchronization of any aspects of that resource enabled), in realtime.

Embodiments of the present invention provide users with indications of multiple synchronization states. For example, embodiments of the present invention may provide a user with indications of whether other users are in sync with particular aspects of one or more resources being managed by the user's host, and if any changes made by the user to a resource will cause the user to diverge from other peers or modify other peers' versions. Embodiments of the present invention may provide such indications to a plurality of users. Such indications enable users to work more efficiently and to avoid making undesired changes to their own versions of resources and to their peers' versions of those resources.

Embodiments of the present invention provide users with the ability to manage both their own versions of resources and to other users' versions of those resources, such as by forcing a change made by the user to a particular version of a resource to be propagated to (synchronized with) other users' versions of that resource. This provides users with control over the effects of the changes that they make to resources, enables users to avoid undesired side effects of those changes, and reduces the amount of effort needed by multiple users to keep their resources in sync in Providing a shared screen does not always scale well when peers are participating on various device screen sizes, orientations, and input methods. In recognition of this problem, embodiments of the present invention may enable various visible content to remain visible if configured, but tailor the presentation of such information for each peer. For example, a user on a desktop computer may be viewing a screen in landscape view, with a video outlet and a document outlet, side by side. Another user may be viewing the same content on a mobile device in portrait mode, with the video only consuming a small portion of the screen, or as an overlay, while the document occupies a majority of the space to be readable and responsive. As additional outlets are added or removed, the system will adapt to ensure that the same content is visible while the aspect to view the same subject is joined; All the while providing indicators to reassure this. If for some reason one user is unable to display the same content as another, or chooses not to, the aspect synchronizing the visibility will be out of sync and the users' indicators will convey this.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention automatically synchronizes, for each of one or more resources, a plurality of versions of that resource, such as by synchronizing such versions across a plurality of hosts. Such synchronization is performed automatically over time, such across a plurality of hosts over a network. Such synchronization of computer-implemented resources is not only impossible to implement mentally or manually, but is also inherently rooted in computer technology.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

Any step or act disclosed herein as being performed, or capable of being performed, by a computer or other machine, may be performed automatically by a computer or other machine, whether or not explicitly disclosed as such herein. A step or act that is performed automatically is performed solely by a computer or other machine, without human intervention. A step or act that is performed automatically may, for example, operate solely on inputs received from a computer or other machine, and not from a human. A step or act that is performed automatically may, for example, be initiated by a signal received from a computer or other machine, and not from a human. A step or act that is performed automatically may, for example, provide output to a computer or other machine, and not to a human.

The terms "A or B," "at least one of A or/and B," "at least one of A and B," "at least one of A or B," or "one or more of A or/and B" used in the various embodiments of the present disclosure include any and all combinations of words enumerated with it. For example, "A or B," "at least one of A and B" or "at least one of A or B" may mean: (1) including at least one A, (2) including at least one B, (3) including either A or B, or (4) including both at least one A and at least one B.

Although terms such as "optimize" and "optimal" are used herein, in practice, embodiments of the present invention may include methods which produce outputs that are not optimal, or which are not known to be optimal, but which nevertheless are useful. For example, embodiments of the present invention may produce an output which approximates an optimal solution, within some degree of error. As a result, terms herein such as "optimize" and "optimal" should be understood to refer not only to processes which produce optimal outputs, but also processes which produce outputs that approximate an optimal solution, within some degree of error.

What is claimed is:

1. A method performed by at least one computer processor executing computer program instructions stored on at least one non-transitory computer-readable medium, the method comprising:
   (A) mapping a first instance of a first property ID to a primary version of a first property, the primary version of the first property having a first version ID;
   (B) mapping the first instance of the first property ID to a secondary version of the first instance of the first property ID, the secondary version of the first instance of the first property ID having a second version ID;
   (C) setting an effective version handle of the first instance of the first property ID to reference the primary version of the first property;
   (D) performing a first comparison of a version state of the primary version of the first property to a version state of the secondary version of the first instance of the first property ID to produce first comparison result output representing a result of the first comparison;
   (E) exposing a first instance state to indicate: (1) that the effective version handle of the first instance of the first property ID references the primary version of the first property; and (2) the first comparison result output;
   (F) setting the effective version handle of the first instance of the first property ID to reference the secondary version of the first instance of the first property ID;

(G) exposing the first instance state to indicate: (1) that the effective version handle of the first instance of the first property ID references the secondary version of the first instance of the first property ID; and (2) the first comparison result output.

2. The method of claim 1, further comprising:
(H) mapping a second instance of the first property ID to the primary version of the first property;
(I) mapping the second instance of the first property ID to a secondary version of a second instance of the first property ID, the secondary version of the second instance of the first property ID having a third version ID;
(J) setting an effective version handle of the second instance of the first property ID to reference the primary version of the first property;
(K) performing a second comparison of the version state of the primary version of the first property to a version state of the secondary version of the second instance of the first property to produce second comparison result output representing a result of the second comparison; and
(L) exposing a second instance state to indicate: (1) that the effective version handle of the second instance of the first property ID references the primary version of the first property; and (2) the second comparison result output.

3. The method of claim 2, further comprising:
(M) modifying the version state of the primary version of the first property to produce a modified version state of the primary version of the first property;
(N) performing a third comparison of the modified version state of the primary version of the first property to the version state of the secondary version of the first instance of the first property to produce third comparison result output representing a result of the third comparison;
(O) performing a fourth comparison of the modified version state of the primary version of the first property to the version state of the secondary version of the second instance of the first property to produce fourth comparison result output representing a result of the fourth comparison;
(P) exposing a third instance state to indicate: (1) that the effective version handle of the first instance of the first property ID references the secondary version of the first instance of the first property; and (2) the third comparison result output; and
(Q) exposing a fourth instance state to indicate: (1) that the effective version handle of the second instance of the first property ID references the primary version of the first property; and (2) the fourth comparison result output.

4. The method of claim 3, further comprising:
(R) setting the effective version handle of the first instance of the first property ID to reference the primary version of the first property; and
(S) exposing a fifth instance state to indicate: (1) that the effective version handle of the first instance of the first property ID references the primary version of the first property; and (2) the third comparison result output.

5. The method of claim 4, further comprising:
(T) manifesting output, via a user interface, representing the fifth instance state, the output including visual output indicating: (1) that the effective version handle of the first instance of the first property ID references the primary version of the first property; and (2) the third comparison result output.

6. The method of claim 3, further comprising:
(R) manifesting output, via a user interface, representing the third instance state, the output representing the third instance state including visual output indicating: (1) that the effective version handle of the first instance of the first property ID references the secondary version of the first instance of the first property; and (2) the third comparison result output.

7. The method of claim 6, further comprising:
(S) manifesting output, via a user interface, representing the fourth instance state, the output representing the fourth instance state including visual output indicating: (1) that the effective version handle of the second instance of the first property ID references the primary version of the first property; and (2) the fourth comparison result output.

8. The method of claim 3, further comprising:
(R) generating a first indicator state based on the third instance state and the fourth instance state, wherein the first indicator state represents the third instance state and the fourth instance state.

9. The method of claim 8, wherein generating the first indicator state further comprises generating the first indicator state to further indicate that a notify-on-change mode of the first instance of the first property ID is enabled.

10. The method of claim 3, further comprising:
(R) generating a second indicator state based on the third instance state and the fourth instance state, wherein the second indicator state represents the second instance state and the first instance state.

11. The method of claim 10, wherein generating the second indicator state further comprises generating the second indicator state to further indicate that a notify-on-change mode of the first instance of the first property ID is enabled.

12. The method of claim 10, wherein (R) further comprises:
determining whether the effective version handle of the first instance of the first property ID indicates that the third comparison result output should be reflected in the second indicator state;
in response to determining that the effective version handle of the first instance of the first property ID indicates that the third comparison result output should not be reflected in the second indicator state, generating the second indicator state to represent the first instance state, the fourth comparison result output, and the second instance state; and
in response to determining that the effective version handle of the first instance of the first property ID indicates that the third comparison result output should be reflected in the second indicator state, generating the second indicator state to represent the first instance state, the fourth comparison result output, the second instance state, and the third comparison result output.

13. The method of claim 3, further comprising:
(R) exposing the first instance state to further indicate that a notify-on-change mode of the first instance of the first property ID is enabled.

14. The method of claim 13, further comprising:
(S) in response to a host of the second instance of the first property ID modifying the version state of the primary version of the first property to produce a modified version state of the primary version of the first property;

(S)(1) making a copy of the version state of the primary version of the first property, thereby producing a transient version of the first property;

(S)(2) setting the effective version handle of the first instance of the first property ID to reference the transient version of the first property.

15. The method of claim 14, wherein (S) further comprises:

(S)(3) generating the second indicator state to further indicate that the effective version handle of the first instance of the first property ID references the transient version of the first property; and (S)(4) generating the second indicator state to further indicate that the effective version handle of the first instance of the first property ID references the transient version of the first property because the version state of the primary version of the first property was modified by the host of the second instance of the first property ID.

16. The method of claim 15, wherein (S) further comprises:

(S)(5) generating the first indicator state to further indicate that the effective version handle of the first instance of the first property ID references the transient version of the first property because the version state of the primary version of the first property was modified by the host of the second instance of the first property ID.

17. The method of claim 3, further comprising:

(R) in response to a command from a host to set the effective version handle of the first instance of the first property ID and the effective version handle of the second instance of the first property ID to a common value, setting the effective version handle of the first instance of the first property ID and the effective version handle of the second instance of the first property ID to reference the primary version of the first property.

18. The method of claim 17, further comprising:

(S) setting the effective version handle of the first instance of the first property ID to reference the secondary version of the first instance of the first property ID;

(T) setting the effective version handle of the second instance of the first property ID to reference the secondary version of the second instance of the first property ID.

19. The method of claim 2, further comprising:

(M) manifesting output, via a user interface, representing the second instance state, the output including visual output indicating: (1) that the effective version handle of the second instance of the first property ID references the primary version of the first property; and (2) the second comparison result output.

20. The method of claim 2, further comprising:

(M) identifying a set of available actions based on the first instance state and the second instance state.

21. The method of claim 2, further comprising:

(M) dereferencing the effective version handle of the second instance of the first property ID to identify an effective version of the second instance of the first property ID;

(N) generating the second indicator state to indicate that at least one of the first instance of the first property ID and a third instance of the first property ID does not reference the effective version of the second instance of the first property ID.

22. The method of claim 2, further comprising:

(M) dereferencing the effective version handle of the second instance of the first property ID to identify an effective version of the second instance of the first property ID;

(N) generating the second indicator state to indicate that both of the first instance of the first property ID and a third instance of the first property ID reference the effective version of the second instance of the first property ID.

23. The method of claim 2, further comprising:

(M) receiving a request for a version state of the first instance of the first property ID;

(N) responding to the request for the version state of the first instance of the first property ID, comprising:

(N)(1) identifying a version of the first instance of the first property ID to which the first instance of the first property ID is mapped;

(N)(2) identifying a version state of the version of the first instance of the first property ID to which the first instance of the first property ID is mapped; and (N)(3) responding to the request for the state of the first instance of the first property ID with the version state of the version of the first instance of the first property ID to which the first instance of the first property ID is mapped.

24. The method of claim 2, further comprising:

(M) receiving a request to modify a version state of the first instance of the first property ID, the request including a value;

(N) processing the request to modify the version state of the first instance of the first property ID, comprising:

(N)(1) identifying a version of the first instance of the first property ID to which the first instance of the first property ID is mapped;

(N)(2) identifying a version state of the version of the first instance of the first property ID to which the first instance of the first property ID is mapped; and (N)(3) modifying the version state of the version of the first instance of the first property ID to which the first instance of the first property ID is mapped based on the value.

25. The method of claim 24:

wherein a first host performs (E) and (G);

wherein a second host performs (L); and wherein (M) comprises, at the first host, receiving the request from the second host.

26. The method of claim 1, further comprising:

(H) manifesting output, via a user interface, representing the first instance state, the output including visual output indicating: (1) that the effective version handle of the first instance of the first property ID references the secondary version of the first instance of the first property; and (2) the first comparison result output.

27. The method of claim 1, further comprising:

(H) mapping a first instance of a second property ID to a primary version of a second property, the primary version of the second property having a fourth version ID;

(I) setting the effective version handle of the first instance of the first property ID to reference the primary version of the first property;

(J) setting an effective version handle of the first instance of the second property ID to reference the primary version of the second property.

28. The method of claim 27, further comprising:
(K) setting the effective version handle of the first instance of the first property ID to reference the secondary version of the first instance of the first property;
(L) setting the effective version handle of the first instance of the second property ID to reference a secondary version of a first instance of the second property.

29. The method of claim 28:
wherein the effective version handle of the second instance of the first property ID references the secondary version of the second instance of the first property ID; and
wherein the method further comprises:
(J) setting the version state of the version of the first property referenced by the second instance of the first property ID to be equal to the version state of the version of the first property referenced by the effective version handle of the first instance of the first property ID.

30. The method of claim 28:
wherein the effective version handle of the second instance of the first property ID references the secondary version of the second instance of the first property ID; and
wherein the method further comprises:
(J) setting the version state of the version of the first property ID referenced by the effective version handle of the first instance of the first property ID to be equal to the version state of the version of the first property ID referenced by the effective version handle of the second instance of the first property ID.

31. The method of claim 1, further comprising:
(H) setting the effective version handle of the first instance of the first property ID to reference the primary version of the first property;
(I) generating the first indicator state to indicate that at least one of a version state of a version of the first property referenced by a second instance of the first property ID and a version state of a version of the first property referenced by a third instance of the first property ID is not equal to the version state of the primary version of the first property;
wherein an effective version handle of the second instance of the first property ID references a secondary version of the second instance of the first property ID; and
wherein an effective version handle of the third instance of the first property ID references a secondary version of the third instance of the first property ID.

32. The method of claim 1, further comprising:
(H) setting the effective version handle of the first instance of the first property ID to reference the primary version of the first property;
(I) generating the first indicator state to indicate that both of a version state of a version of the first property referenced by a second instance of the first property ID and a version state of a version of the first property referenced by a third instance of the first property ID are equal to the version state of the primary version of the first property;
wherein an effective version handle of the second instance of the first property ID references a secondary version of the second instance of the first property ID; and
wherein an effective version handle of the third instance of the first property ID references a secondary version of the third instance of the first property ID.

33. A system comprising at least one non-transitory computer-readable medium having computer program instructions stored thereon, the computer program instructions being executable by at least one computer processor to perform a method, the method comprising:
(A) mapping a first instance of a first property ID to a primary version of a first property, the primary version of the first property having a first version ID;
(B) mapping the first instance of the first property ID to a secondary version of the first instance of the first property ID, the secondary version of the first instance of the first property ID having a second version ID;
(C) setting an effective version handle of the first instance of the first property ID to reference the primary version of the first property;
(D) performing a first comparison of a version state of the primary version of the first property to a version state of the secondary version of the first instance of the first property ID to produce first comparison result output representing a result of the first comparison;
(E) exposing a first instance state to indicate: (1) that the effective version handle of the first instance of the first property ID references the primary version of the first property; and (2) the first comparison result output;
(F) setting the effective version handle of the first instance of the first property ID to reference the secondary version of the first instance of the first property ID;
(G) exposing the first instance state to indicate: (1) that the effective version handle of the first instance of the first property ID references the secondary version of the first instance of the first property ID; and (2) the first comparison result output.

* * * * *